US008010488B2

(12) United States Patent
Ushiyama

(10) Patent No.: US 8,010,488 B2
(45) Date of Patent: Aug. 30, 2011

(54) INFORMATION DISTRIBUTION SYSTEM, INFORMATION PROCESSING DEVICE AND MEMORY MEDIUM

(75) Inventor: Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 600 days.

(21) Appl. No.: 12/149,496

(22) Filed: May 2, 2008

(65) Prior Publication Data
US 2008/0270421 A1 Oct. 30, 2008

Related U.S. Application Data

(63) Continuation-in-part of application No. PCT/JP2006/322812, filed on Nov. 16, 2006.

(30) Foreign Application Priority Data

Nov. 21, 2005 (JP) ................................. 2005-336367

(51) Int. Cl.
*G06F 7/00* (2006.01)
*G06F 17/00* (2006.01)
(52) U.S. Cl. ......................... 707/622; 707/633; 707/637
(58) Field of Classification Search .................. 707/610, 707/620, 621, 622, 633, 637
See application file for complete search history.

(56) References Cited

U.S. PATENT DOCUMENTS

| 5,774,287 A * | 6/1998 | Leonhardt et al. ............... 360/48 |
| 7,020,704 B1 * | 3/2006 | Lipscomb et al. ............ 709/226 |
| 7,032,236 B1 * | 4/2006 | Ozkan et al. ..................... 725/39 |
| 7,136,903 B1 * | 11/2006 | Phillips et al. ................. 709/217 |
| 2003/0156538 A1 * | 8/2003 | Lebizay et al. ................. 370/231 |
| 2004/0143836 A1 * | 7/2004 | McCormack et al. ........ 719/316 |
| 2006/0031257 A1 * | 2/2006 | Lipscomb et al. ......... 707/104.1 |
| 2007/0024705 A1 * | 2/2007 | Richter et al. ................. 348/142 |
| 2007/0115804 A1 | 5/2007 | Hibino |
| 2007/0271492 A1 * | 11/2007 | Yahata et al. .................. 714/755 |
| 2008/0147778 A1 | 6/2008 | Ushiyama et al. |
| 2009/0016203 A1 * | 1/2009 | Yahata et al. ............... 369/272.1 |

FOREIGN PATENT DOCUMENTS

| JP | A-2002-300145 | 10/2002 |
| JP | A-2003-67279 | 3/2003 |
| JP | A-2003-99337 | 4/2003 |
| JP | A-2003-099354 | 4/2003 |
| JP | A-2003-216521 | 7/2003 |
| JP | A-2004-213508 | 7/2004 |
| JP | A-2006-023991 | 1/2006 |

(Continued)

OTHER PUBLICATIONS

Oka et al., "Lightweight Load Balancing for Distributed Hash Tables," Technical Report of the Institute of Electronics Information and Communication Engineers, 2004.

(Continued)

*Primary Examiner* — Rehana Perveen
*Assistant Examiner* — Mark Hershley
(74) *Attorney, Agent, or Firm* — Oliff & Berridge, PLC

(57) ABSTRACT

An information distribution system is provided with a plurality of information processing devices that are capable of communication with each other via a network, and that store shared information so that the information can be shared by the plurality of information processing devices. The shared information is shared information that has a public release time that is before the current time.

17 Claims, 29 Drawing Sheets

FOREIGN PATENT DOCUMENTS

| | | |
|---|---|---|
| JP | A-2006-277337 | 10/2006 |
| JP | A-2007-034630 | 2/2007 |

OTHER PUBLICATIONS

Yamada et al., "An Effect on Query Processing and Load balancing by Efficient Data Placement on Peer to Peer Systems," Transactions of Information Processing Society of Japan, vol. 45, No. SIG7 (TOD22), Jun. 15, 2004.

Kido et al., "Replication Strategy Depending on Access Frequency in Peer-to-Peer Networks," Information Processing Society of Japan Kenkyu Hokoku, vol. 2005, No. 6, 2005-DBS-135, Jan. 21, 2005.

Cohen et al., "Replication Strategies in Unstructured Peer-to-Peer Networks," ACM SIGCOMM'02, Aug. 22, 2002.

Japanese Patent Office, Notification Reason for Refusal mailed Oct. 5, 2010 in Japanese Patent Application No. 2005-336367 w/English-language Translation.

Minami, "A Proposal of Node Selection Based on Proximity for Peer-to-Peer File Sharing System," Research Report of Information Processing Society vol. 1 2002 No. 11 IPSJ SIG Notes, Information Processing Society, Feb. 7, 2002, p. 3-9.

\* cited by examiner

INFORMATION DISTRIBUTION SYSTEM, INFORMATION PROCESSING DEVICE AND MEMORY MEDIUM

The entire disclosure of Japanese Patent Application No. 2005-336367 filed on Nov. 21, 2005 including the specification, scope of claims, drawings, and summary is incorporated herein by reference into its entirety.

BACKGROUND OF THE INVENTION

1. Field of the Invention

The present invention relates to an information distribution system, information processing device and memory medium, and more particularly to an information distribution system, information processing device and memory medium that record contents (shared information), such as a movie that is to be shared among a plurality of information processing devices, in a plurality of information processing devices of the information distribution system before making the contents public so they can be shared.

2. Discussion of the Related Art

Recently, much research and development is being performed of a system in which a terminal device (node) is used to access a server or the like that stores contents such as mentioned above via an network such as the Internet, and having contents desired for viewing at that node distributed to that node and viewed, or in other words, a so-called contents distribution system.

Also, as an example of that kind of distribution system is a distribution system in which the contents are directly exchanged between nodes of a network, for example, there is a P2P (Peer-to-Peer) type distribution system, which is a distribution system in which the contents are distributed among a plurality of nodes, and the contents are shared by the plurality of nodes. The aim of this kind of P2P type of distribution system is to solve the problems of concentrated access of a server and high management costs that are disadvantages of a conventional client-server type model.

Moreover, in the research being done in this field, in Peer-to-Peer, for example, in an overlay network that is logically created using a distributed hash table (hereafter, referred to as DHT), the nodes do not recognize the link information (for example, IP address) of all of the nodes that participate in that overlay network, and contains only link information for part of the nodes that is obtained when participating, and performs data inquiries based on that link information.

In this kind of overlay network, load distribution must be adequately performed even when node participation and withdrawal (separation) are performed frequently, and the non-patent document. "Lightweight Load Balancing for Distributed Hash Table", Technical Report of The Institute of Electronics Information and Communication Engineers, discloses a technique for adequately performing load distribution in an overlay network even when participation and withdrawal (separation) are performed frequently. Moreover, distributing copies (replicas) of the contents among a plurality of nodes and having a node keep those contents is effective in avoiding concentrated access of certain nodes, and prior proposals related to the creation and placement of replicas are disclosed for example in Japanese patent application 2003-99337 and Japanese patent application 2003-216521.

Japanese patent application 2003-99337 discloses a method of creating and placing replicas (copies) with good balance over an entire network within a service group by referencing the overall size (overall amount of information) and number of contents that exist at each of the nodes that are connected within that service group of a network.

Furthermore, Japanese patent application 2003-216521 discloses a method of inserting parameters such as level of importance into each of the contents, and creating many replicas of popular contents.

[Non-Patent Document 1]
"Lightweight Load Balancing for Distributed Hash Tables", Technical Report of The Institute of Electronics Information and Communication Engineers

[Patent Document 1]
Japanese patent application 2003-99337

[Patent Document 2]
Japanese patent application 2003-216521

SUMMARY OF THE INVENTION

In this kind of distribution system, when performing a contents distribution service using distribution storage technology, there is concentrated access for popular contents, so it is preferred that replicas be made according to the popularity of the contents, however, in the case of the method disclosed in Japanese patent application 2003-216521, replicas are made only after the contents are actually made public and are requested.

However, similar to as is seen in the pattern of demand at a typical movie or video rental and CD shop, in a distribution service as well, contents are most popular immediately after being made public, and when performing operation as a service, replicas were made after the contents were made public, so there was a problem in that it was not possible to handle the increase in demand, and there was a concentration of access at the node having the contents first.

Taking into consideration the problems described above, it is the object of the present invention to provide an information distribution system that is capable of autonomously distributing and placing the necessary number of contents within the distribution system before the contents are made public.

The present invention recited in claim 1 for solving the problems is directed to an information distribution system that is provided with a plurality of information processing devices that are capable of communicating with each other via a network, and that store at least one item or more of shared information so that the information can be shared by the plurality of information processing devices, wherein each the information processing device, that is provided with: a shared information recording means for recording at least one item or more of the shared information; a public release time information memory means for storing public release time information for each item of shared information that indicates the time at which the shared information that is recorded by the shared information recording means can be shared by the plurality of information processing devices; an evaluation value information memory means for storing evaluation value information for each item of shared information that indicates an evaluation value for the adaptability of copying the shared information; a device selection means for selecting an information processing device from among the plurality of information processing devices that will give instruction to record shared information, and where the shared information that is the object of the information recording instruction is shared information from among the shared information that is recorded by the shared information recording means that is found by referencing the public release time information memory means and the evaluation value information memory means to have a public release time that is before the current time, and which evaluation value satisfies specified conditions; and a recording instruction information transmission means for transmitting recording instruction information to an information processing device that was selected by the device selection means giving instruction to record the shared information that is the object of the recording instruction; wherein in the plurality of information processing devices, the information processing device that received the recording instruction information, that is provided with: an ID (identification data) information transmission means for transmitting unique ID information corresponding to the shared information in order to search the plurality of information processing devices for the information processing devices that store the shared information that is the object of the recording instruction; a communication load information acquisition means for acquiring communication load information related to communication loads in the communication paths between the selected information processing device itself and one or more of the information processing device that store the shared information that is the object of the recording instruction; a communication load comparison means for comparing the communication loads in the communication paths; a request information transmission means for transmitting request information to one of the information processing devices that store the shared information that is the object of the recording instruction, which is connected by way of the communication path that is found to have a relatively small communication load based on the comparison results by the communication load comparison means, requesting the transfer of the shared information that is the object of the recording instruction; an information reception means for receiving the shared information that is the object of the recording instruction from the information processing device that was the transmission destination of the request information; and a memory control means for storing received shared information in the shared information memory means; and wherein in the plurality of information processing devices, the information processing device that received the request information that is provided with a shared information transmission means for transmitting the shared information that is the object of the recording instruction to the information processing device that is the transmission source of the request information.

Figure 1:
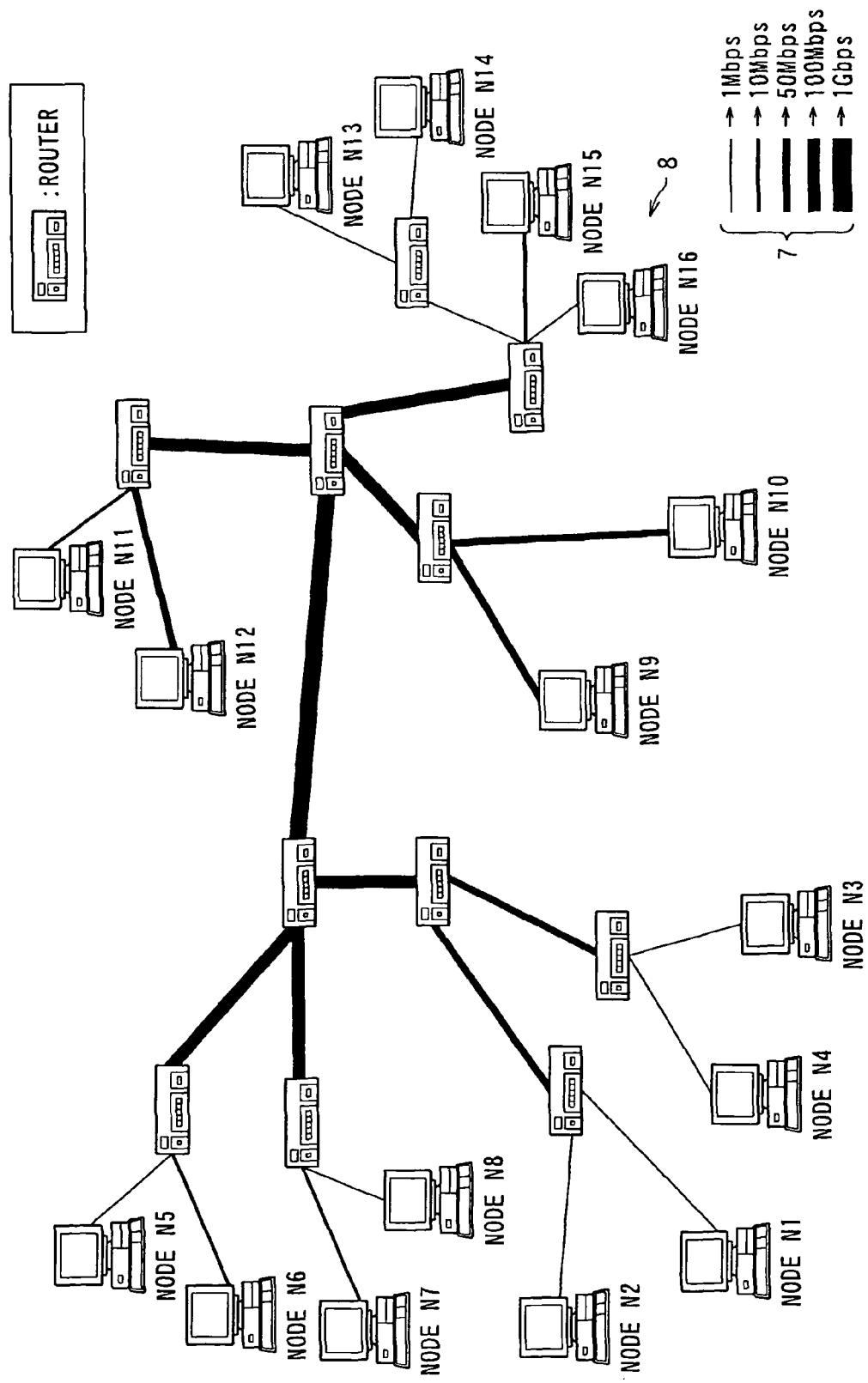
FIG. 1 is a drawing showing the construction of a P2P type distribution system of a first and second embodiment of the present invention.

Each designation of numerical reference in the drawings is typically as follows:
11 Control unit
12 Memory unit
13 Buffer memory
14 Decoder unit
15 Video processing unit
16 Display unit
17 Audio processing unit
18 Speaker
19 Communication unit
20 Input unit
21 Bus
X contents
N (N1, N2, . . . N16, Nr, Nh) A-O Node
VALUE evaluation value, copy number
To public release preparation period
I copying start time E public release period
Sr empty recording capacity in the memory unit 12

DETAILED DESCRIPTION OF THE PREFERRED EMBODIMENTS

Next, the preferred embodiments of the invention will be explained based on the drawings. Each of the embodiments described below are embodiments in which the present invention is applied to a P2P type distribution system that performs distribution of contents using a network such as the Internet, and is for the case in which in accordance to a request operation to distribute contents that is executed by one terminal device, the desired contents are distributed to that terminal device from another terminal device. In the explanations below, the terminal device will be referred to as a 'node'.

The preferred embodiments of the invention will be explained below based on the drawings. The embodiments explained below are embodiments for the case in which the present invention is applied to a distribution system.
<Construction of the Distribution System>

First, the construction of a distribution system as an information distribution system will be explained with reference to FIG. 1.

FIG. 1 is a drawing showing an example of the connected state of all of the nodes in the distribution system of an embodiment of the invention.

As shown in FIG. 1, a network (actual worldwide network) 8, such as the Internet, comprises various kinds of routers such as an IX (Internet exchange), ISP (Internet Service Provider), DSL (Digital Subscriber Line) line business (equipment of the business), FTTH (Fiber To The Home) line business (equipment of the business) and the like, and communication lines (telephone lines, fiber optic cables, etc.) 7.

A distribution system is created so that it comprises a plurality of nodes N1, N2, N3, . . . , N14, N15, N16 that are mutually connected together via the network 8 to form a Peer-to-Peer type network system. Unique product numbers and IP (Internet Protocol) addresses are assigned to each of the nodes N1, N2, N3, . . . as information that indicates the respective nodes (node information). The product numbers and IP addresses are not repeated among the plurality of nodes. In the explanation below, for convenience, node N may be used to indicate some of the nodes N of the nodes N1, N2, N3.

In order for these nodes N to be able to share contents (X1), (X2), (X3), . . . , there is a simple method in which each of the nodes N1 that participate in the network 8 knows the IP addresses of each of the nodes N1 that participate in the network 8, however, when there is a large number of terminals such as several thousands or hundred thousands of terminals, it is not practical to learn the IP addresses of all of the nodes N1. Moreover, when the power to an arbitrary node N is turned ON or OFF, the update of the IP address for that arbitrary node that is stored in each of the nodes N1 becomes frequent, and makes operation difficult.

Therefore, in one node N, only the IP addresses for the minimum necessary number of nodes N of the nodes N that participate in the network 8 are learned (stored), and when there is a node N which IP address is not known (not stored), an overlay network is created by an algorithm that uses a distributed hash table (hereafter referred to as DHT) that obtains information by having information transferred among all of the nodes N. In other words, this overlay network is a network that comprises virtual links that are formed using the existing network 8.

In this embodiment, it is presumed that an overlay network is created from an algorithm that uses a DHT, and the nodes N that are located in this overlay network are called the nodes N that participate in a distribution system (in other words, participate in the overlay network), and unique numbers are given to each of the nodes N as node IDs (identification datas) for each of the nodes N. This number must have just the number of bits so that it is possible to accommodate the maximum number of operating nodes N. For example, in the case of a 128-bit number, there can be $2^{128} \approx 340^{36}$ operating nodes N. For example, by hashing the unique values for each node N, such as the product number or IP address, with a common hash coefficient (hash algorithm), and setting the obtained hash values as the node IDs, the nodes N are dispersed and located without bias in one ID space. Hash coefficients are well known, so a detailed explanation is omitted here.

Moreover, contents (X) is distributed and saved (stored) among the plurality of nodes N that participate in the distribution system as shared information such as a movie or music that is to be distributed from one node N to another node N, however, a unique number (hereafter referred to as the contents ID) is given to each respective contents (X). For example, a keyword such as the name of the contents (contents title) or summary information for the contents (synopsis) is hashed by a hash coefficient that is common with the coefficient used when obtaining the node IDs, and the obtained hash value is set as the contents ID, so each contents (X) is dispersed and located with minimal bias in the same ID space as the nodes N.

Determining which node N is to manage which contents (X) is performed by the following set rule. In this embodiment, there is the rule that 'a node N that manages contents (X) having a certain contents ID is a node N that has a node ID that is close to that contents ID'. Here, the definition of 'close' is the smallest difference between the contents ID and node ID without exceeding that contents ID, however, any rule can be used as long as there is consistency when assigning the management of contents (X) to the nodes N.

Here, the term 'manage' not only means to save and maintain the contents (X), but also means to 'know which node N1 save the contents (X)'. In the explanation below, the nodes N that manage the contents (X1) are called 'root nodes (managing devices) of the contents (X1)', and the node N having the smallest difference from a certain hash value is called the 'root node' of that hash value.

In this distribution system, by having a plurality of nodes N store (record) the contents before being made public, or in other words before it is possible for the contents to be shared among a plurality of nodes N, the present invention is able to provide a distribution system that is capable of smoothly handling the case in which there are requests at the same time for contents immediately after the contents become public.

It will be explained in more detail later, however, when sending a recording instruction message to a plurality of nodes giving instruction to record the contents before the contents are made public, or when sending a contents request message to request that the nodes that received that instruction transfer the contents, the messages are transferred based on the DHT routing table that is held by each node.
<Node Construction>

Figure 2:
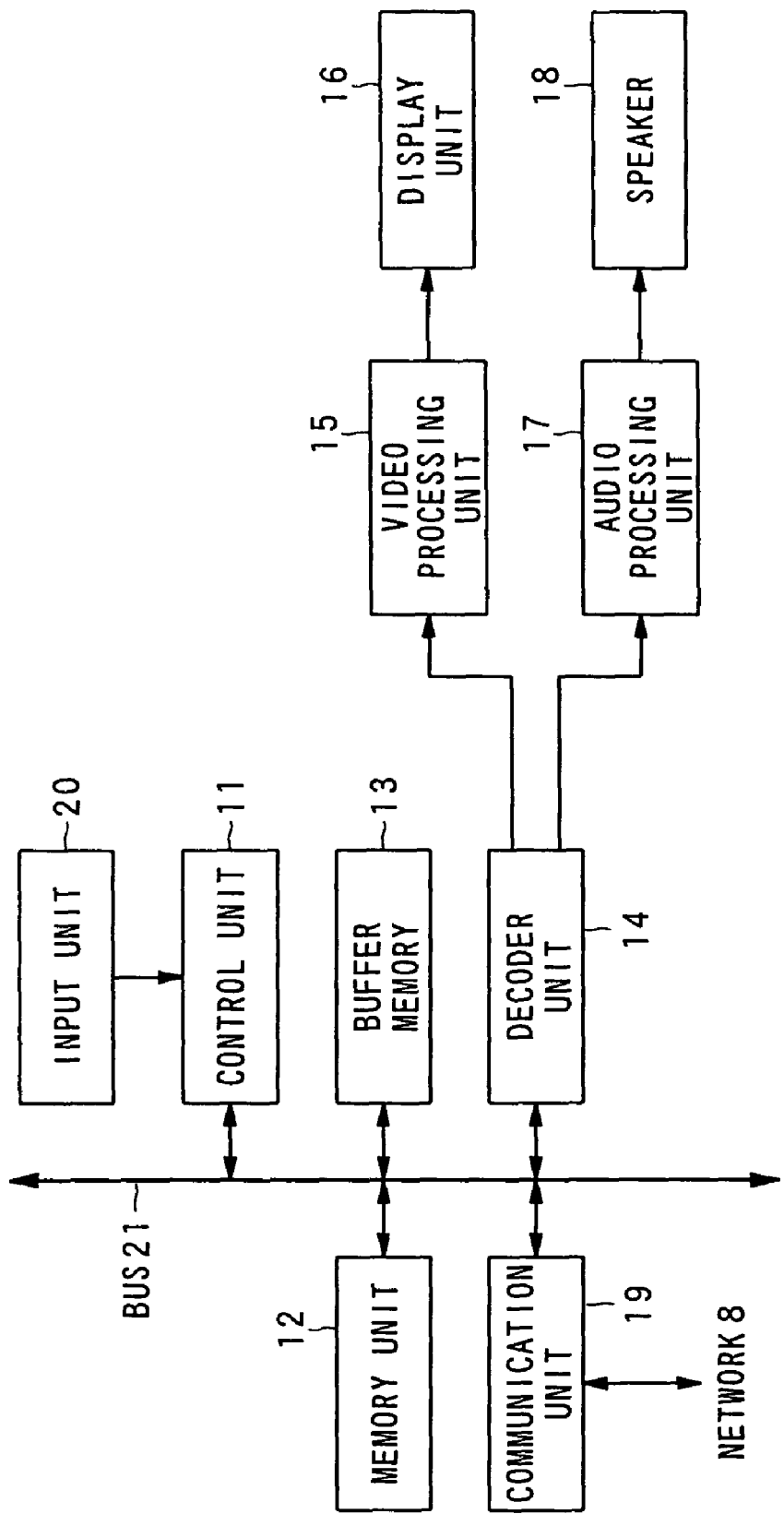
FIG. 2 is a block diagram showing the construction of nodes in a first and second embodiment of the invention.

First, the construction of the nodes that are mutually connected together with each other by a network in the distribution system of this embodiment will be explained using FIG. 2. FIG. 2 is a block diagram showing the construction of the nodes of the embodiments of the invention. All of the nodes that belong to the P2P type distribution system of this embodiment have the same hardware construction, so FIG. 2 will be used to explain the construction of a typical representative node N.

As shown in FIG. 2, the nodes, which are computers, that are included in the distribution system of each of the embodiments described comprise: a control unit 11 that functions as a shared information recording means having a CPU that has a computational function, RAM (Random Access Memory) that functions as a work area, and ROM (Read Only Memory), which is a recording medium on which various data and programs (including an information processing program) are recorded, public release time information memory means, evaluation value information memory means, device selection means, recording instruction information transmission means, ID information transmission means, communication load information acquisition means, communication load comparison means, request information transmission means, information receiving means, memory control means, shared information transmission means and recording successful information transmission means; a memory unit 12 that functions as a shared information recording means, which comprises a HDD (Hard Disc Drive) or the like for recording and saving (storing) contents data, which is the contents described above, various routing data necessary for performing distribution, and other necessary programs, public release time information recording means and evaluation value information recording means; a buffer memory 13 that temporarily stores received contents data; a decoder unit 14 that decodes (decompresses, decodes, etc.) encoded video data (video information) and audio data (audio information) that is contained in the contents data; a video processing unit 15 that performs specified graphic processing of the decoded video data and outputs the result as a video signal; a display unit 16 that comprises a CRT (Cathode Ray Tube) or liquid-crystal display that displays video based on the video signal that is output from the video processing unit 15; an audio processing unit 17 that performs D/A (Digital/Analog) conversion to convert the decoded audio data from a digital signal to an analog signal, and then amplifies and outputs the result by way of an amplifier; a speaker 18 that outputs the audio signal that is output from the audio processing unit 17 as sound waves; a communication unit 19 that functions as recording instruction information means for controlling the communication of information between the node and other nodes N via a network, ID information transmission means, communication load information acquisition means, request information transmission means, information receiving means, shared information transmission means and recording successful information transmission means; and an input unit (keyboard, mouse, operation panel, etc.) 20 that receives instructions from the user and outputs instruction signals that correspond to those instructions to the control unit 11; where the control unit 11, memory unit 12, buffer memory 13, decoder unit 14 and communication unit 19 are connected by way of a bus 21 so that they are capable of sending and receiving data mutually between each other.

Moreover, the control unit 11, by way of the CPU in the control unit 11, performs overall control of the operations of the node N of the embodiments by executing various programs that are recorded in the memory unit 12; and the control unit 12, together with the other components described above are such that the node N functions as the information processing device of the present invention.

The embodiments of the distribution system of the present invention are explained in detail below.

I. First Embodiment

In the node N, which is the information processing device of a first embodiment of the invention, the memory unit 12, together with the control unit 11, functions as the shared information recording means, public release time information recording means, and evaluation value information memory means, and as is shown in the table below, the memory unit 12 stores data of the contents, which are to be newly registered in the distribution system (hereafter referred to as 'contents data'), public release time information To, which is correlated with the contents and indicates the time when the contents are to be made public, and copy number VALUE, which indicates the number of copies of the contents that are to be copied in the system before the contents are made public, as a 'pre-release contents information list'.

TABLE 1

| | CORRESPONDING INFORMATION | |
|---|---|---|
| CONTENTS DATA | PUBLIC RELEASE TIME INFORMATION | COPY NUMBER VALUE |
| CONTENTS (X1) | TO (X1) | VALUE (X1) |
| CONTENTS (X2) | TO (X2) | VALUE (X2) |
| CONTENTS (X3) | TO (X3) | VALUE (X3) |
| . | . | . |
| . | . | . |
| . | . | . |
| CONTENTS (Xn) | TO (Xn) | VALUE (Xn) |

The copy number VALUE mentioned above is one example of an evaluation value that indicates the copy adaptability of the embodiment, and the larger this value is, the higher the copy adaptability is, or in other words, in terms of contents to be copied, copies are made until this copy number VALUE becomes 1 or less. The public release time information To and copy number VALUE for the contents (X1) are correlated with the contents and stored as public release time information To(X1) and copy number VALUE(X1), the public release time information To and copy number VALUE for the contents (X2) are correlated with the contents and stored as public release time information To(X2) and copy number VALUE(X2), and similarly the public release time information To and copy number VALUE for the contents (Xn) are correlated with the contents and stored as public release time information To (Xn) and copy number VALUE (Xn).

Moreover, of the contents (X) of the 'Pre-release Contents Information List', contents (X) that satisfy certain specified conditions become the object of a recording instruction, and of the nodes N that participate in the system, nodes N that are to be instructed to record the contents are selected, and a recording instruction message is sent to the selected nodes as recording instruction information giving instructions to record the contents (X) that are the object of the recording instruction.

The procedure for copying contents in the distribution system is explained in detail below using the drawings.

Figure 3:
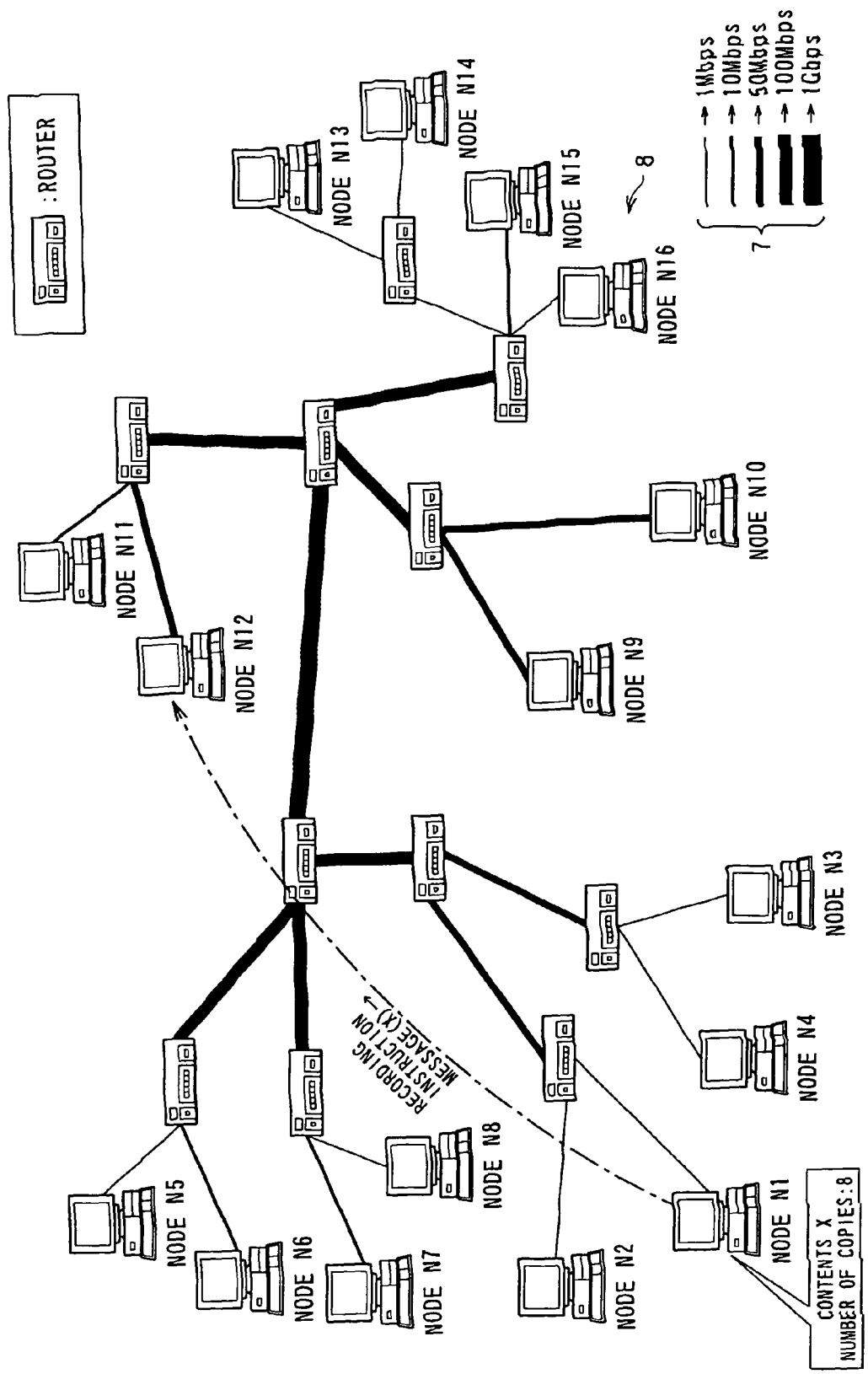
FIG. 3 is a drawing showing the state in which node N1 sends a recording instruction message for recording the contents (X).

FIG. 3 is a drawing showing the state in which the node N1 sends a recording instruction message for contents (X).

Node N1 selects contents (X) from among the contents stored in the memory unit 12 that satisfy certain specified conditions as the object of the recording instruction, and selects node N12 from among the nodes N that participate in the system as the node to be instructed to record the contents, and sends a recording instruction message (X) to node N12 instructing it to record contents (X).

The specified conditions in this embodiment are: (1) the time at which the contents indicated by the public release time information To that corresponds to the contents does not exceed the current time, and (2) the number of copies to be made that is indicated by the copy number VALUE that corresponds to the contents is greater than 1.

Node N1 in FIG. 3 references the 'pre-release contents information list' that is stored its own memory unit 12 and selects the contents from among the contents stored in the memory unit 12 that satisfy conditions (1) and (2), and sets those contents (X) as the object of the recording instruction. The number of copies made of the contents (X) that are the object of this recording instruction is '8'.

Figure 4:
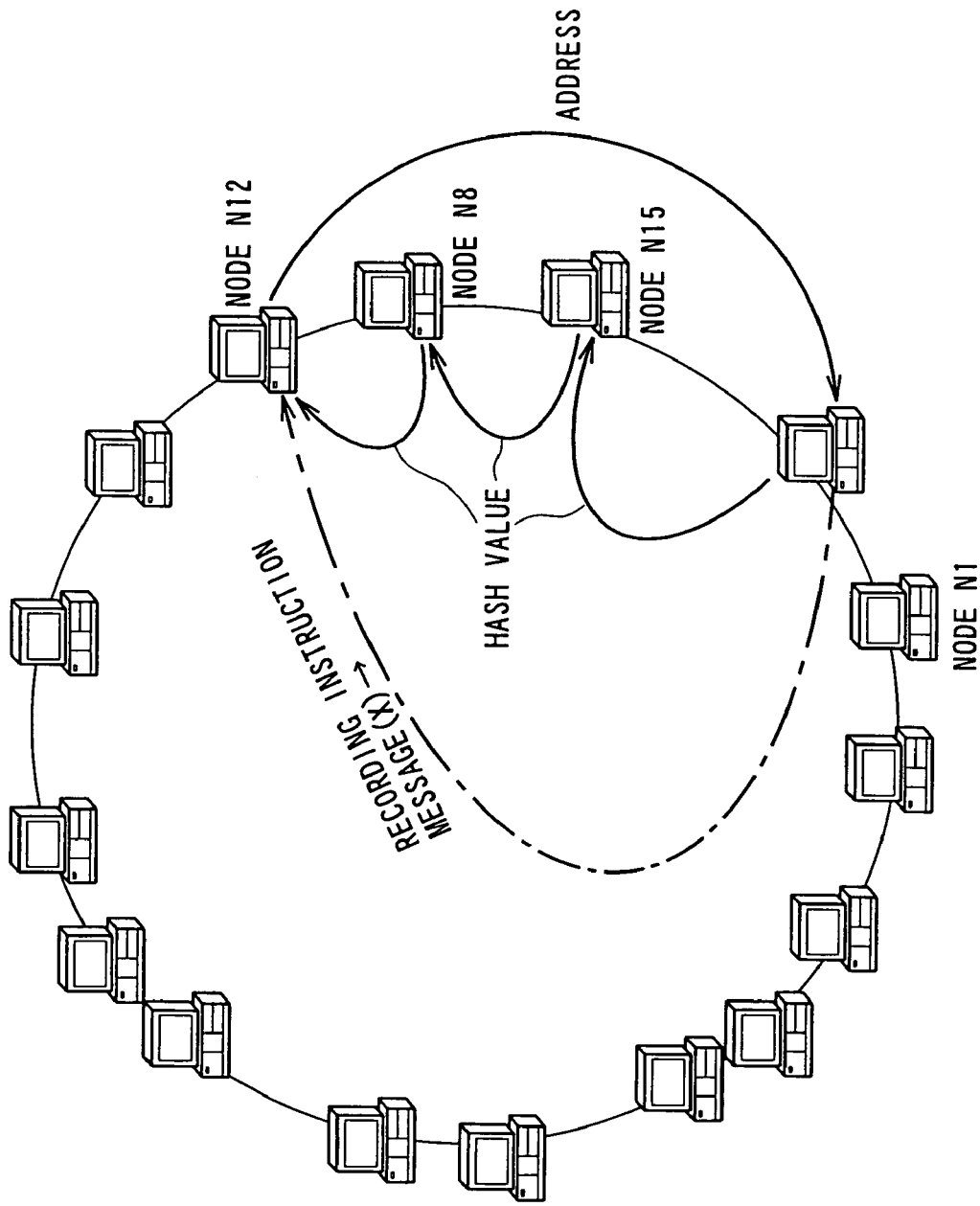
FIG. 4 is a drawing for explaining an ID space in a first and second embodiment of the invention.

The node N1 generates at random a character string (ID) made up of letters and numbers, and based on that ID, uses a specified hash coefficient to acquire a hash value. The node N1 also uses a DHT to search for a root node in the ID space shown in FIG. 4 based on the acquired hash value, and the root node that is found is selected as a node N to be given the recording instruction.

It is also possible, instead of using a randomly generated character string, to acquire at random, the title of arbitrary contents from the 'pre-release contents information list' that is stored in the memory unit 12, and based on that, use a specified hash coefficient to acquire a hash value. In that case, the root node and keyword root node of the contents are selected as nodes N to be given the recording instruction.

Figure 5:
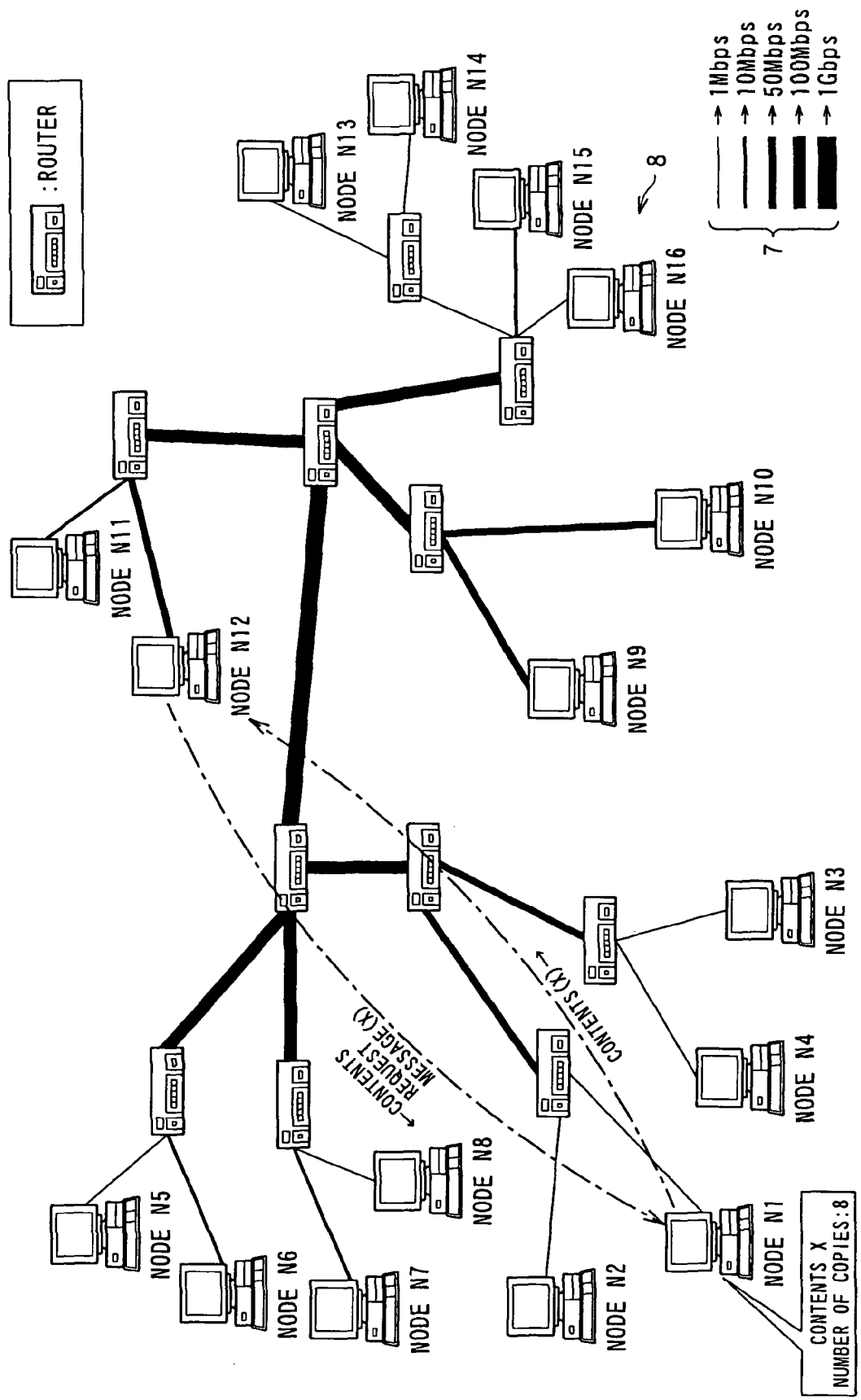
FIG. 5 is a drawing showing the state in which node N12 receives the contents (X).

FIG. 5 is a drawing showing the state in which the node N12 that received the recording instruction message requests and receives the contents (X).

Node N12 searches the nodes N that store the contents (X) for which the recording instruction was given. More specifically, the control unit 11 of node N12 functions as ID information transmission means and request information transmission means, and using a specified hash coefficient, acquires the hash value as unique ID information of the contents (X) for which the recording instruction was given, and obtains information from the root node that manages the location of the contents (X) about the location where the nodes N that store the contents (X) are, and accesses the nodes N. In the example shown in FIG. 5, node N1 is the only node that stores the contents (X), so node N12 obtains the location of node N1 as the node N storing the contents (X) from the root node that manages the location of the contents (X), and sends a contents request message to that node N1 requesting the contents (X), and receives the contents (X).

Figure 6:
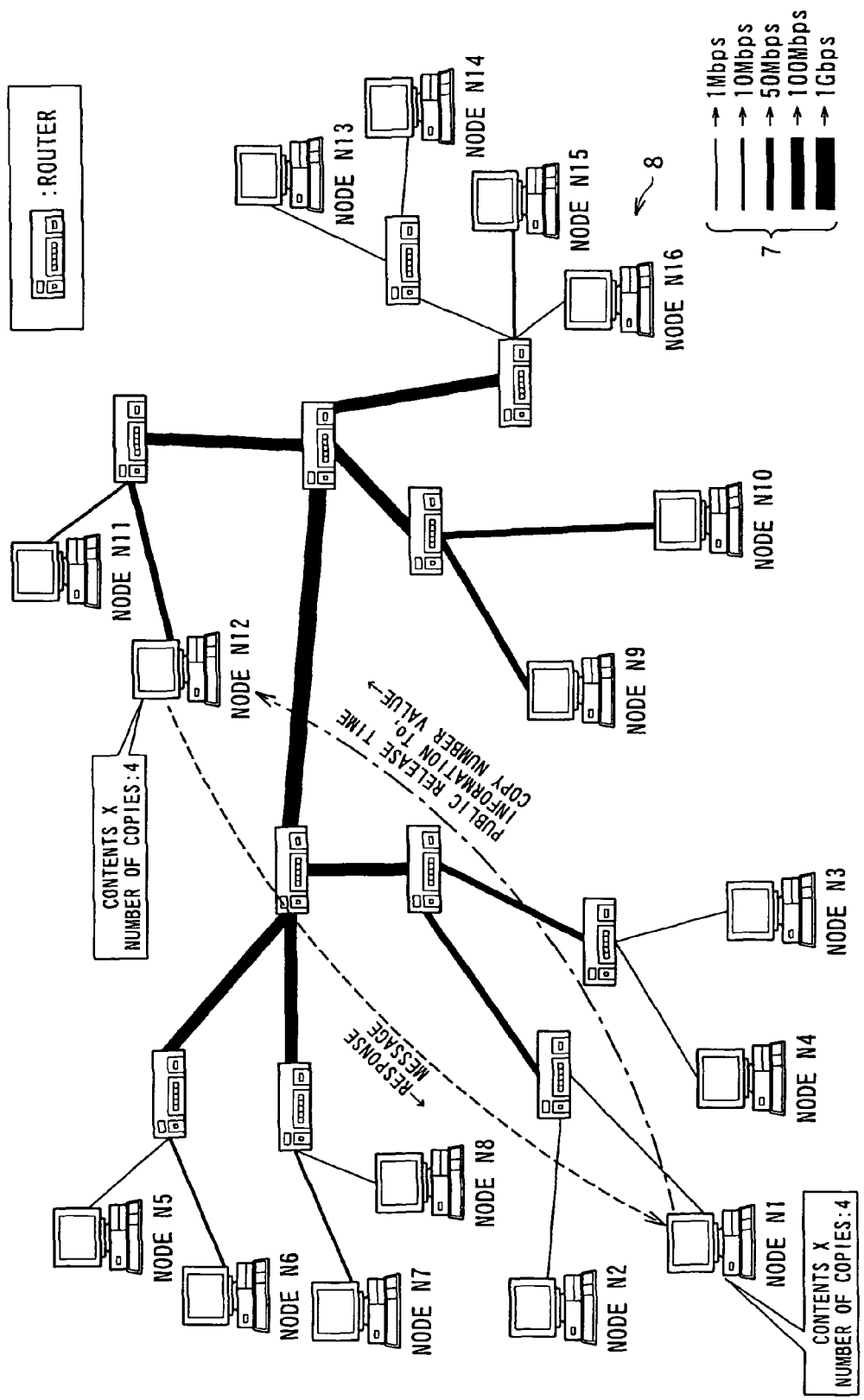
FIG. 6 is a drawing showing the state in which node N12 responds with the contents (X).

FIG. 6 is a drawing showing the state in which node N12 returns a response indicating whether or not recording of the contents (X) was successful.

The control unit 11 of the node N12 functions as recording control means and recording successful information transmission means, and stores the received contents (X) in the 'pre-release contents information list' in its own memory unit 12, and sends a response message to node N1 that was the source of the recording instruction message (X) indicating that recording of the contents (X) was successful.

The control unit 11 of node N1 also functions as recording control means, and after receiving the response message from node N12 indicating that recording of the contents (X) was successful, updates the copy number VALUE (X) of the contents (X) stored in the 'pre-release contents information list', and stores the value again in the 'pre-release contents information list', then sends the updated copy number VALUE (X) and the public release time information To (X) to the node N12. In the example shown in FIG. 6, the updated copy number VALUE (X) is one half the number of copies '8' before the update, or in other words, the new number of copies is updated to be '4', and the copy number VALUE (X) that indicates that number of copies is sent to the node N12. At node N12 that receives that value, the control unit 11 functions as memory control means, and correlates the copy number VALUE (X) and public release time information To(X) received from node N1 with the contents (X) and stores them in the 'pre-release contents information list'.

Figure 7:
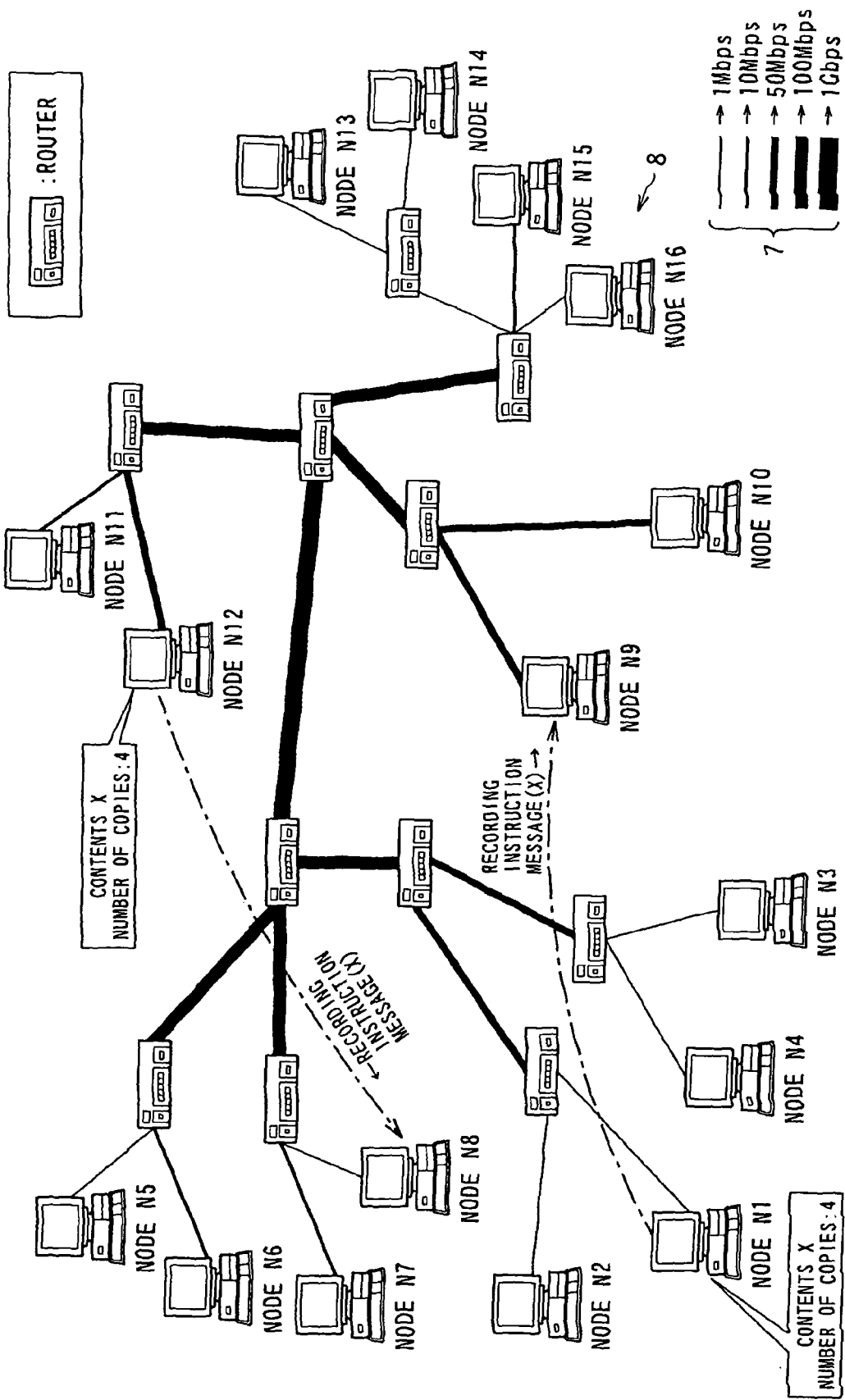
FIG. 7 is a drawing showing the state in which node N1 and N12 send a record instruction message to record the contents (X).

FIG. 7 is a drawing showing the state in which node N1 and node N12 send recording instruction messages for contents (X).

In the same way as described above, node N1 selects node N9 from among the nodes N participating in the system as the node to instruct to record the contents (X) that satisfy specified conditions, and sends a recording instruction message (X) to node N9 giving instructions to record the contents (X). Node N12 also sends a recording instruction message (X) to node N8 that was selected in the same way giving instructions to record contents (X).

Figure 8:
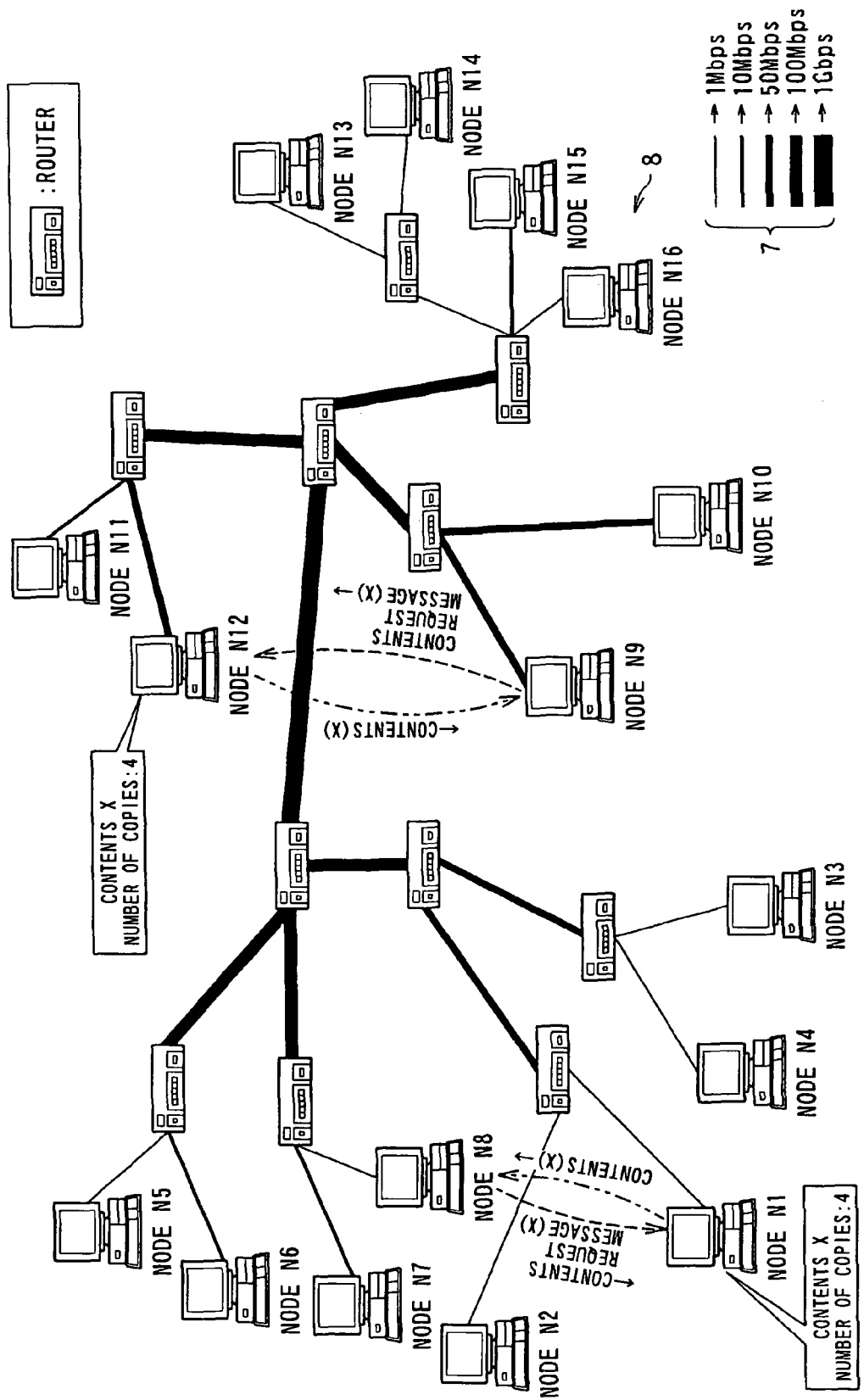
FIG. 8 is a drawing showing the state in which node N9 and node N8 receive the contents (X).

FIG. 8 is a drawing showing the state in which node N9 and node N8 that received the recording instruction messages request and receive the contents (X).

Node N9 and node N8 obtain the nodes N that store the contents (X) from the root node that manages the location of the contents (X) for which the recording instruction was given, and access those nodes N.

When as a result of the search there is a plurality of nodes N that store the contents (X), the control units 11 of node N9 and node N8 also function as communication load information acquisition means and communication load comparison means, and acquire the communication loads of the communication paths between the respective nodes N. In the method for acquiring the communication load, information is exchanged with the respective nodes N and the communication load is acquired. The communication load is smaller the smaller the number of relays (smaller the number of hops) is or the shorter the delay time is. When the effective bandwidth of the communication path is known, the communication load can also be determined based on the effective bandwidth. Node N9 and node N8 compare the communication loads between them and the respective nodes N that store the contents (X), and send contents request messages (X) to the nodes N that are connected by the communication path having a relatively small communication load requesting the contents (X).

In the example shown in FIG. 8, node N9 obtains node N1 and node N12 from the root node that manages the location of the contents (X) as the nodes N that store the contents (X), however, sends the contents request message (X) to node N12 that is connected by way of a communication path having the smaller communication load, and receives the contents (X) from that node N12. On the other hand, node N8 similarly obtains node N1 and node N12 from the root node that manages the location of the contents (X) as the nodes N that store the contents (X), however sends the contents request message (X) to node N1 that is connected by way of a communication path having the smaller communication load, and receives the contents (X) from that node N1.

Figure 9:
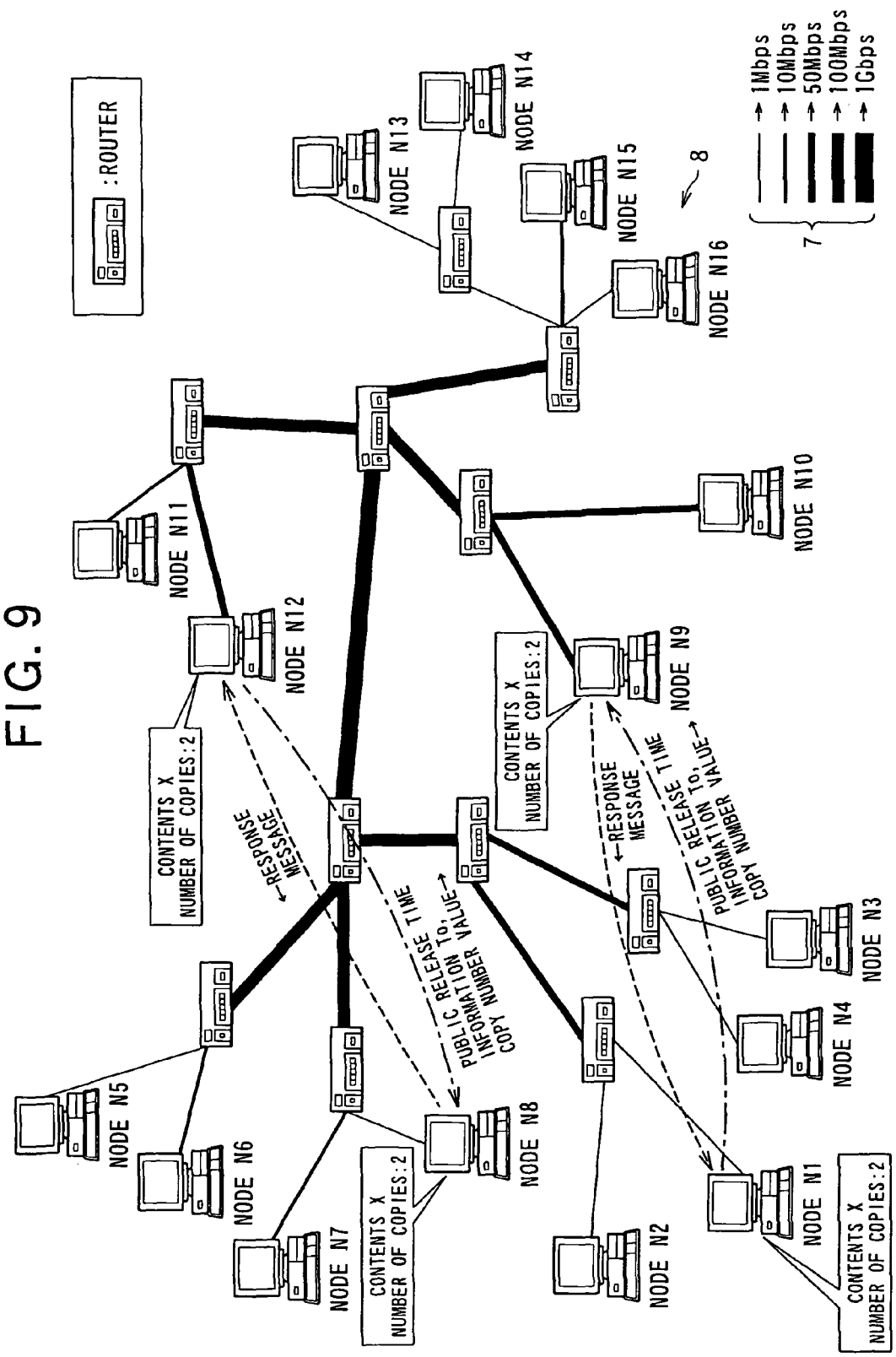
FIG. 9 is a drawing showing the state in which node N9 and node N8 respond.

FIG. 9 is a drawing showing the state in which node N9 and node N8 return a response indicating whether or not recording of the contents (X) was successful.

The control units 11 of nodes N9 and node N8 store the received contents (X) in the 'Pre-release contents information list' in their own memory unit 12, and send a response message to the respective nodes, node N12 and node N1, which are the transmission sources of the recording instruction message (X), indicating that recording of contents (X) was successful.

After, node N12 and node N1 receive response messages from nodes N9 and node N8, respectively, indicating that recording of the contents (X) was successful, they update the copy number VALUE (X) for the contents (X) stored in the 'Pre-release contents information list' and store the value in the 'Pre-release contents information list' again, then send the updated copy number VALUE (X) and the public release time information To the respective nodes N9 and N8. In the example shown in FIG. 9, the updated copy number VALUE (X) is one half the number of copies '4' before the update, or in other words is updated to a new number of copies '2', and the copy number VALUE (X) that indicates that number of copies is sent to the nodes N9 and N8. Node N9 and node N8 receive that value, and correlate the copy number value VALUE (X) received from node N12 or node N1 and the public release time information To(X) with the contents (X) and store them in the 'Pre-release contents information list'.

Figure 10:
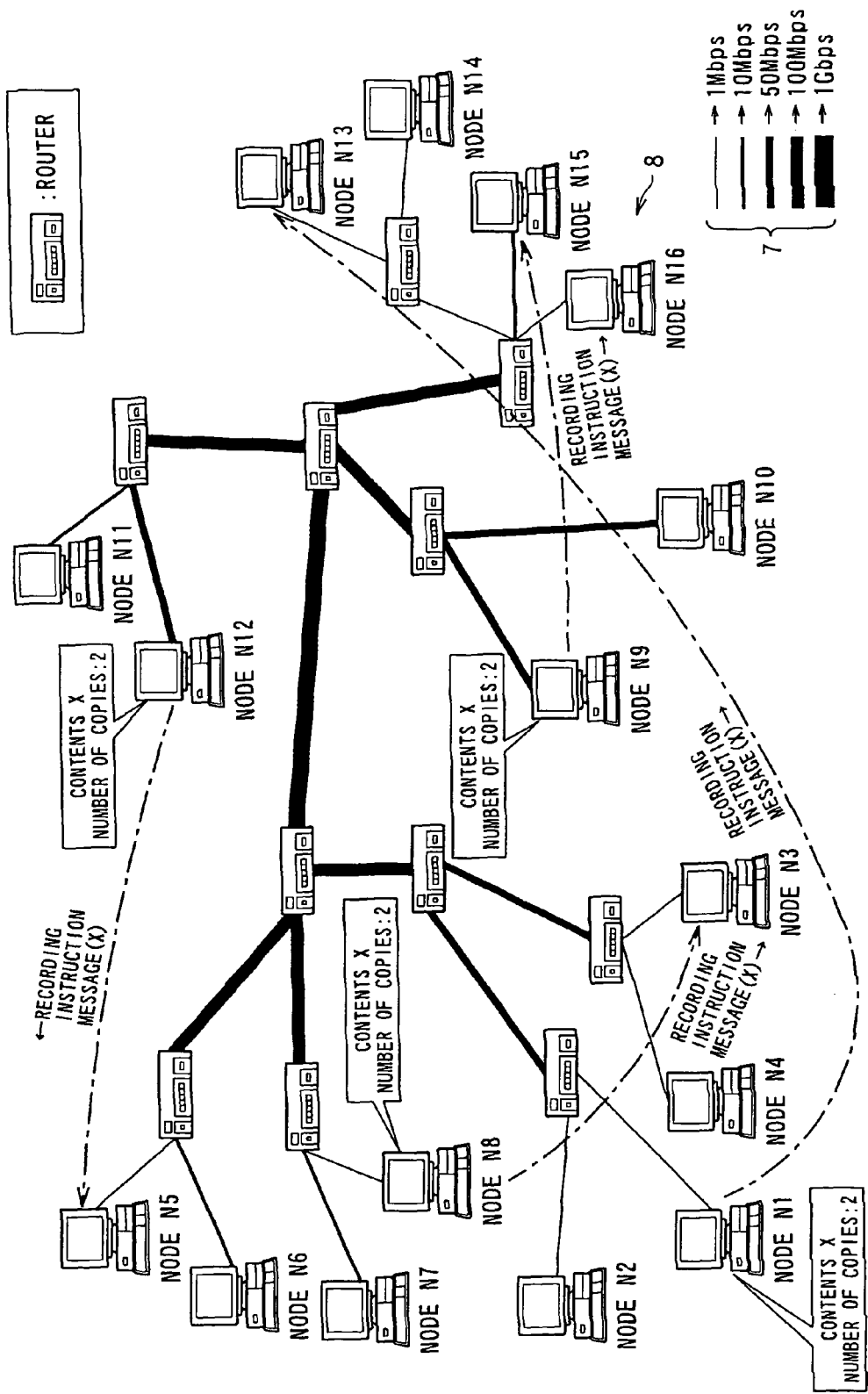
FIG. 10 is a drawing showing the state in which nodes N1, N8, N9 and N12 send a record instruction message to record the contents (X).

FIG. 10 is a drawing showing the state in which the nodes N1, N8, N9 and N12 send recording instruction messages for contents (X).

Node N1 sends a recording instruction message (X) to node N13 as was described above, node N8 sends a recording instruction message (X) to node N3, node N9 sends a recording instruction message (X) to node N15, and node N12 sends a recording instruction message (X) to node N5, similarly giving instruction to record contents (X).

Figure 11:
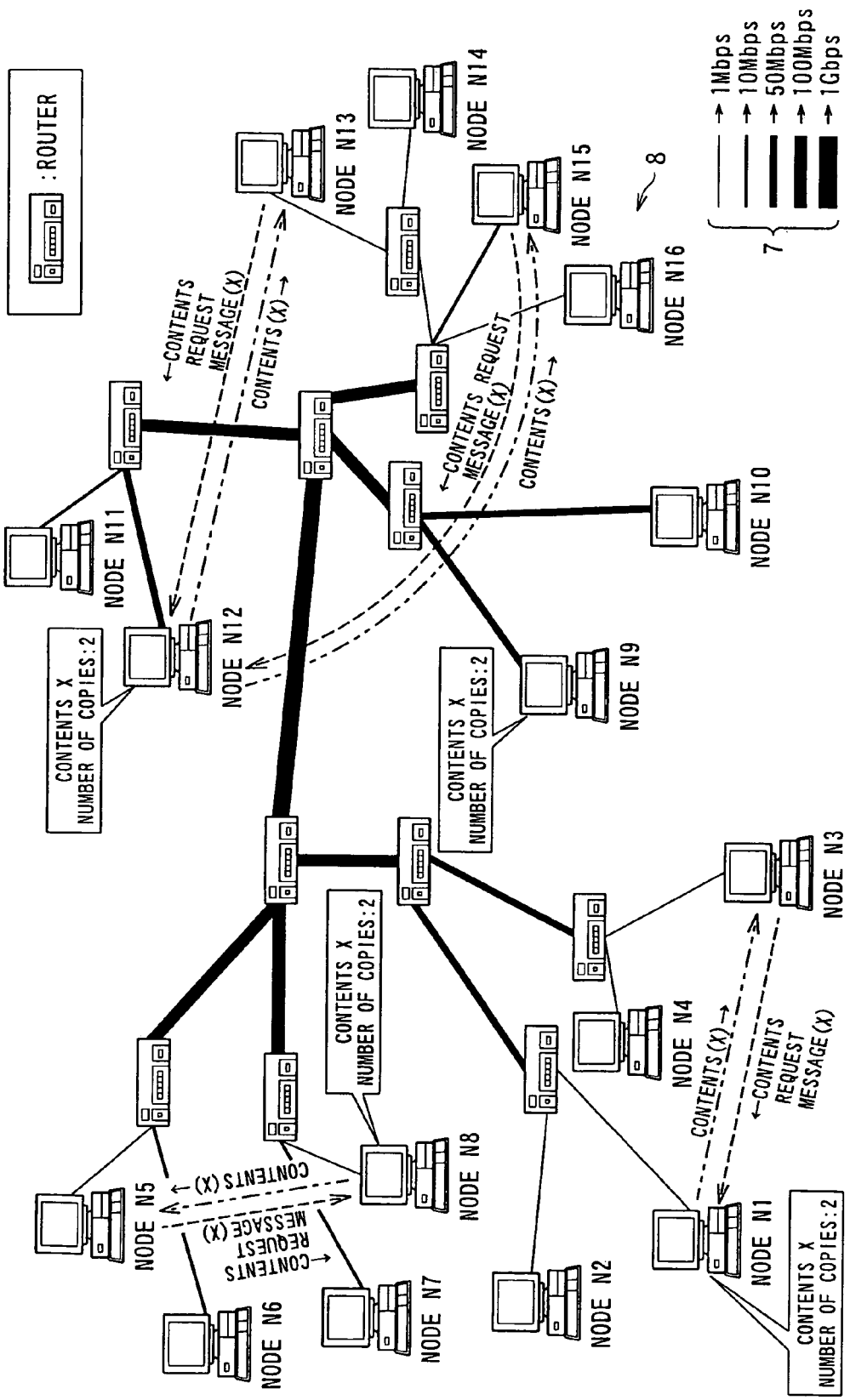
FIG. 11 is a drawing showing the state in which nodes N13, N3, N15 and N5 receive the contents (X).

FIG. 11 is a drawing showing the state in which the nodes N13, N3, N15 and N5 that received the recording instruction messages request and receive the contents (X).

Nodes N13, N3, N15 and N5 obtain from the root node that manages the location of the contents (X) for which there is a recording instruction the nodes N that store the contents (X), and access the nodes N.

The nodes N13, N3, N15 and N5 also send a contents request message (X) to the node N that is connected by way of the communication path having a relatively small communication load and request the contents (X). As shown in FIG. 11, node N12 receives a contents request message (X) from node N13 and node N15, and transfers the contents (X) to node N13 and node N15. It is possible to have requests for the contents from a plurality of nodes N in this way, and to transfer the contents to a plurality of nodes.

Figure 12:
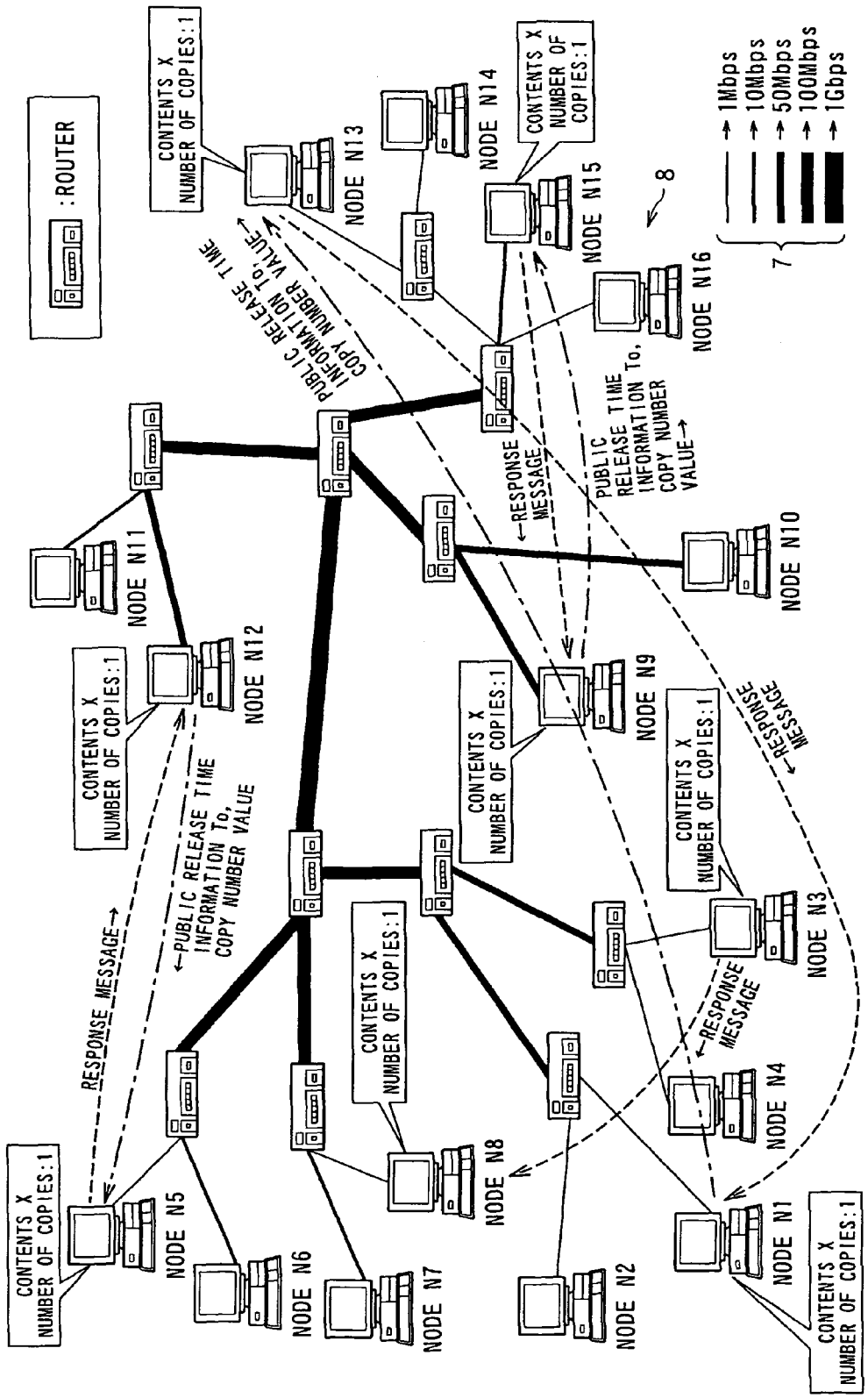
FIG. 12 is a drawing showing the state in which nodes N13, N3, N15 and N5 respond.

FIG. 12 is a drawing showing the state in which the nodes N13, N3, N15 and N5 send a response indicating whether or not recording of the contents (X) was successful.

Nodes N13, N3, N15 and N5 store the received contents (X) in the 'Pre-release contents information list' in their respective memory units 12, and send response messages to the respective nodes N1, N8, N9 and N12, which are the sources of the recording instruction message (X), indicating that recording of the contents (X) was successful.

After receiving the response message indicating that recording of the contents (X) was successful, the nodes N1, N8, N9 and N12 update the copy number VALUE (X) for the contents (X) stored in the 'Pre-release contents information list', and store the value again in the 'Pre-release contents information list', and send the updated copy number VALUE (X) and public release time information To(X) to the respective nodes N13, N3, N15 and N5.

In this way, it is possible to store contents at a plurality of nodes N in advance before the contents are made public, and to distribute the contents within the system, so even in the case where many nodes N request distribution of the contents at the same time after the contents are made public, since the contents are stored in advance by a plurality of nodes N, it is possible to distribute the contents relatively smoothly P to P even immediately after being made public when compared to the case in which the contents are stored at only one node N.

<1. Basic Node Processing>

Figure 13:
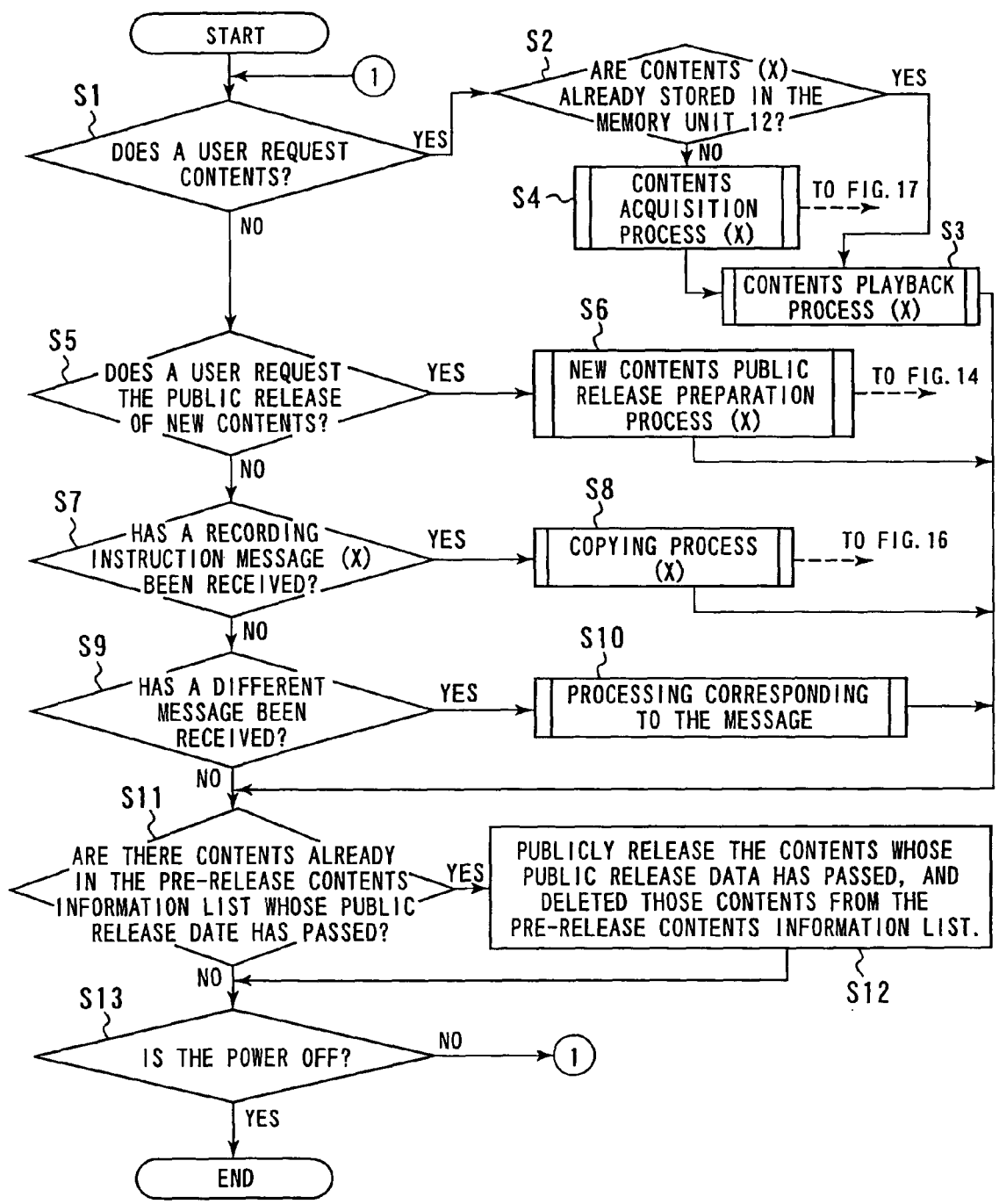
FIG. 13 is a flowchart showing the basic processing in a first embodiment of the invention.

Next, the basic processing by the nodes N in this first embodiment will be explained using the flowchart shown in FIG. 13. This processing is performed by turning ON the power to the node N and executing a program based on control by the control unit 11.

First, the user operates the input unit 20, and the Node N constantly monitors for whether or not operation has been executed to playback the contents (step S1), and when the operation to playback the contents has been executed (step S1: Yes), determines whether or not the requested contents (X) are stored in its own memory unit 12 (step S2), and when the contents (X) are stored in the memory unit 12 (step S2: Yes), obtains the contents (X) from the memory unit 12 and plays back the contents (X) (step S3), then proceeds to step S11. However, in step S2, when the requested contents (X) are not stored in the memory unit 12 (step S2: No), executes the 'contents acquisition process (X)' in order to acquire the contents (X) (step S4), then plays back the contents (step S3) and proceeds to step S11. The processing method of the contents acquisition process (X) will be described later.

On the other hand, in the judgment in step S1, when the operation requesting to playback contents has not been executed (step S1: No), the user operates the input unit 20, and the node N determines whether or not operation has been executed requesting that new contents be made public (step S5), and when there has been a request to make new contents (X) public (step S5: Yes), executes the 'new contents release preparation process (X)' (step S6), then proceeds to step S11. The 'new contents release preparation process (X)' will be explained later.

However, in the judgment of step S5, when an operation requesting the public release of new contents has not been executed (step S5: No), the node N determines whether or not a recording instruction message (X) has been received that gives instruction to record the contents (X) from another node (step S7). When a recording instruction message (X) has been received (step S7: Yes), the node N executes the 'copying process (X)' (step S8), then proceeds to step S11. The 'copying process (X)' will be explained later.

On the other hand, in the judgment of step S7, when a recording instruction message (X) has not been received (step S7: No), the node N determines whether or not any other messages have been received (step S9), and when a message has been received (step S9: Yes), executes the process corresponding to that received message (step S10), then proceeds to step S11. The other messages may be a query (request) or publish (public release) message in the DHT, or may be another message that is received by the communication unit 19.

Next, the node N determines whether or not contents, which public release date has passed, are already in the 'Pre-release contents information list' (step S11), when there are contents which public release date has passed (step S11: Yes), the node releases the contents which public release date has passed and deletes it from the 'Pre-release contents information list' (step S12, then proceeds to step S13.

On the other hand, when there are no contents which public release date has passed (step S11: No), the node N checks whether the power has been turned OFF (step S13), and when the power is still ON (step S13: No), returns to step S1 for the next processing and repeats processing from step S1 to step S13, however when the power has been turned OFF (step S13: Yes), ends processing.

<1-1. Contents Registration Process>

Figure 14:
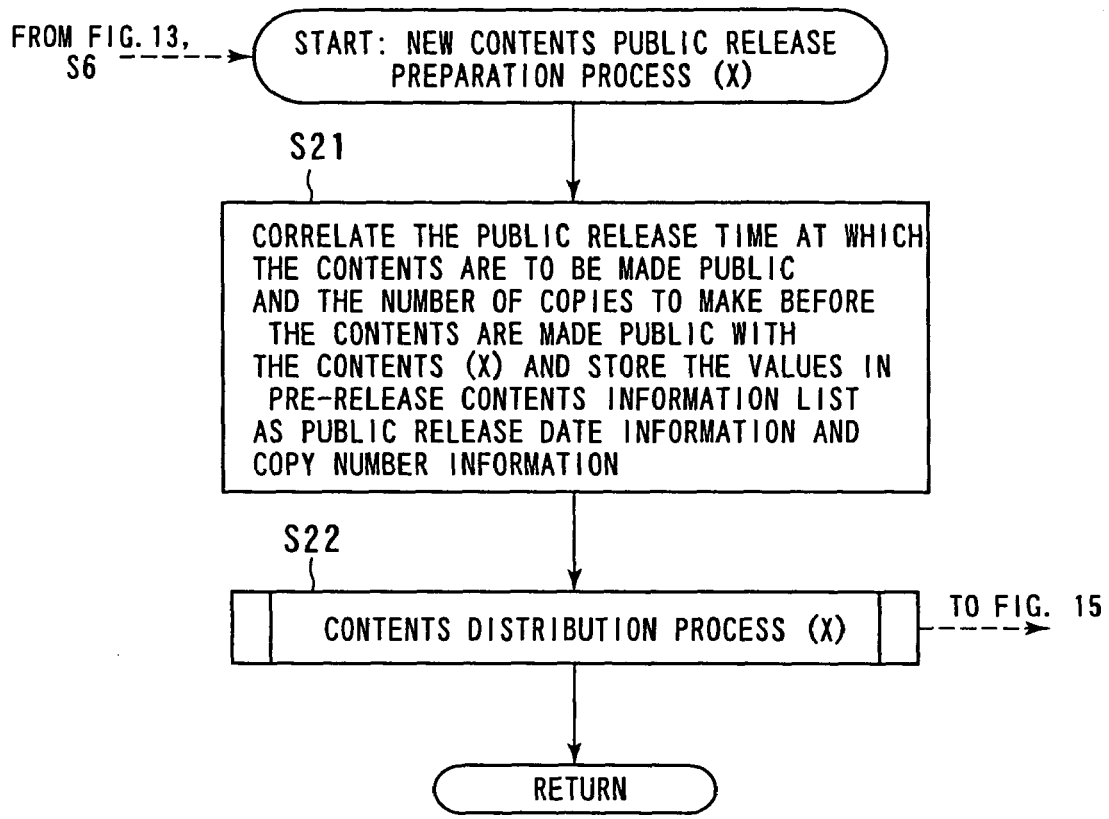
FIG. 14 is a flowchart showing the processing in a first embodiment of the invention for preparing to make public new contents.

Next, the flowchart shown in FIG. 14 will be used to explain the process (new contents release preparation process (X)) performed in step S6 of the processing described in '1. Basic Node Processing' above of placing new contents into the distribution system so they may be shared in the system.

First, the node N correlates the contents (X) to be newly released with various kinds of information and registers the information in the 'Pre-release contents information list' in the memory unit 12 (step S21). More specifically, when the user of the node N operates the input unit 20, the node N inputs the public release time and number of copies in the 'Pre-release contents information list' as public release time information To and copy number VALUE, and newly correlates those values with the contents (X) to be registered and registers the values.

The node N also executes the 'contents distribution process (X)' to distribute the registered contents (X) (step S22).

<1-2. Contents Distribution Process>

Figure 15:
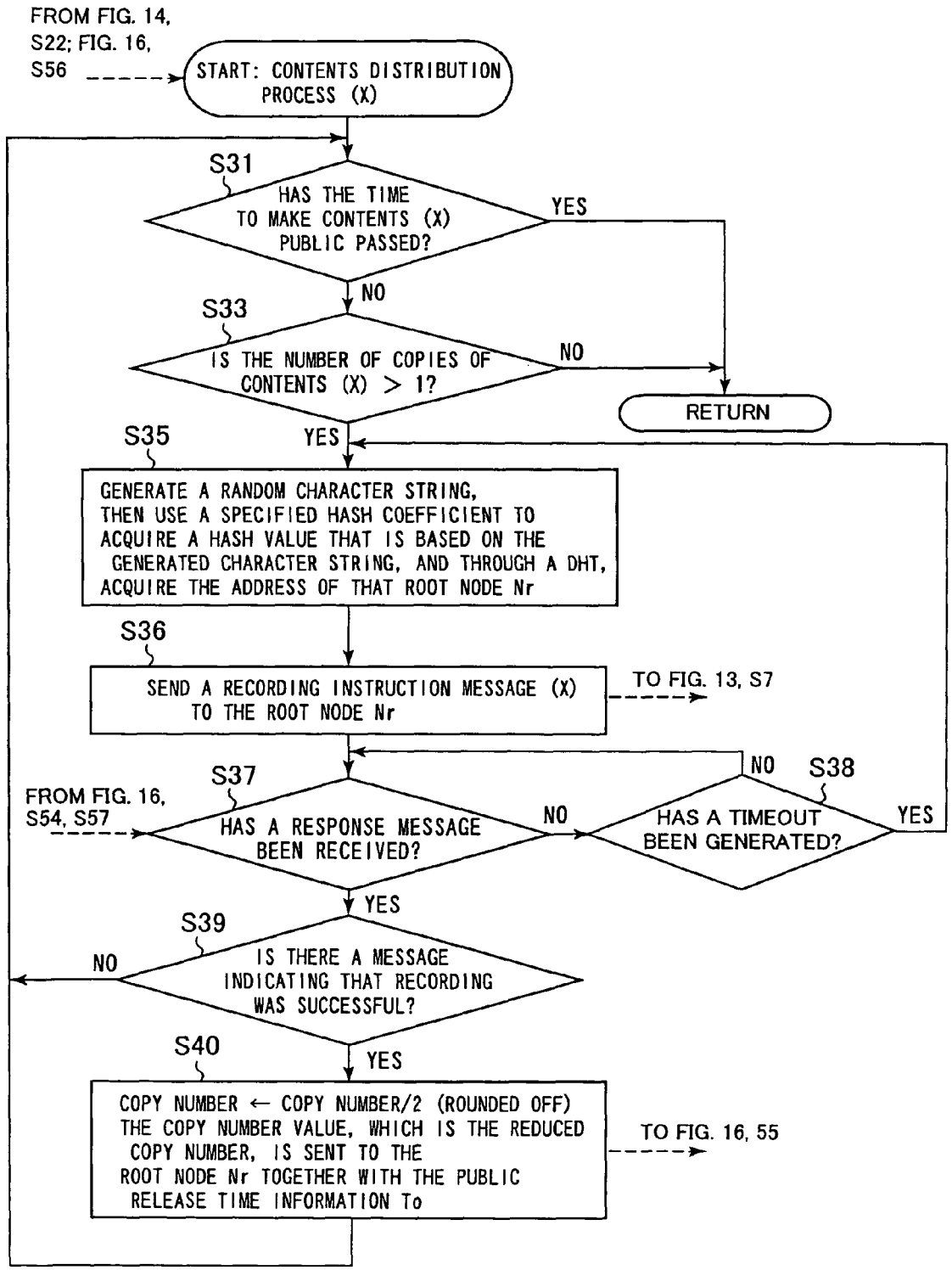
FIG. 15 is a flowchart showing the processing in a first embodiment of the invention for distributing contents.

Next, the flowchart shown in FIG. 15 will be used to explain the 'contents distribution process (X)'.

First, the node determines whether or not the public release time of the contents (X) has already passed (step S31), and when the public release time has already passed (step S31: Yes), ends processing.

However, when the public release time has not yet passed (step S31: No), the node N determines whether or not the number of copies of contents (X) is greater than 1 (step S33), and when the number of copies of the contents (X) is 1 or less (step S33: No), an initially set number of copies have already been made of the contents (X), so the node N ends processing.

When a node N publicly releases contents, the node N makes it possible for the contents (X) that it has to be seen over the entire system, and distributes the contents in response to a contents distribution request. When all of the nodes N that have those contents have not yet publicly released the contents, the root node that manages the location of all the contents (X) can use the elapsed public release time for the contents (X) that it manages itself as a reason to start responding to messages (queries) inquiring of the location of the contents (X) from each node.

However, in the judgment of step S33, when the number of copies of the contents (X) is greater than 1 (step S33: Yes), the specified conditions are satisfied, so the node N gives an instruction to another node N to record the contents (X) as the object of the recording instruction.

As was explained using FIG. 3, the node N generates a character string (ID) at random, or acquires the title of arbitrary contents at random from the 'Pre-release contents information list' stored in the memory unit 12, then uses a specified hash coefficient to acquire a hash value, then selects a root node Nr from the DHT routing based on the hash value as a node for sending the recording instruction, and acquires the address of that root node Nr (step S35). In the example shown in FIG. 4, the hash value arrives at node N12 from node N1, and the address of node N12 is acquired from that node N12.

Moreover, the node N sends a recording instruction message to the root node Nr giving instruction to record the contents (X) (step S36), and confirms whether or not a response message is received from that root node Nr (step S37). When a response message is not received (step S37: No), and when a timeout occurs (step S38: Yes), the node N returns to step S35 and selects again at random a different node N to send the recording instruction, and sends a recording instruction message to that different node N. The node N waits to receive a response message until a timeout occurs.

On the other hand, when a response message is received (step S37: Yes), in the case that that response message is a message indicating that recording of the contents (X) was successful (step S39: Yes), a replica (copy) of the contents has been recorded at the destination node N according to the recording instruction, so the node N decreases the copy number VALUE (X) for the contents (X). More specifically, the node N divides the number of copies of the contents (X) by two, and the node N updates the copy number VALUE (X) for the contents (X) that is stored in the 'Pre-release contents information list' and sends the updated copy number VALUE (X) that indicates the number of copies together with the public release time information To to the root node Nr (step S40). When the number of copies cannot be divided by one place when divided in half, the 'pre-release contents information list' is updated with a rounded off value as the new number of copies, and that decreased amount of the number of copies is sent to the root node Nr as the copy number VALUE (X).

By doing this, it is possible to divide the work of copying the contents half and half with the node that newly stored (recorded) the contents (X).

In the processing of step S39, when the response message from the root node Nr is not a message indicating that recording was successful (step S39: No), and in step S40, when transmission of the copy number VALUE (X) and the public release time information To the root node Nr is finished, the node N returns to step S31, and determines again in steps S31 and S33 whether the contents (X) satisfy specified conditions for the recording instruction, and when the conditions are satisfied, continues executing the distribution process.

From the above, even when a node that was first instructed to record contents failed in making a copy due to some reason, or when a response could not be obtained due to trouble in the communication path, it is possible to send a recording instruction to another node, and so it is possible to distribute contents to a plurality of nodes N before making the contents public.

<1-3. Copying Process>

Figure 16:
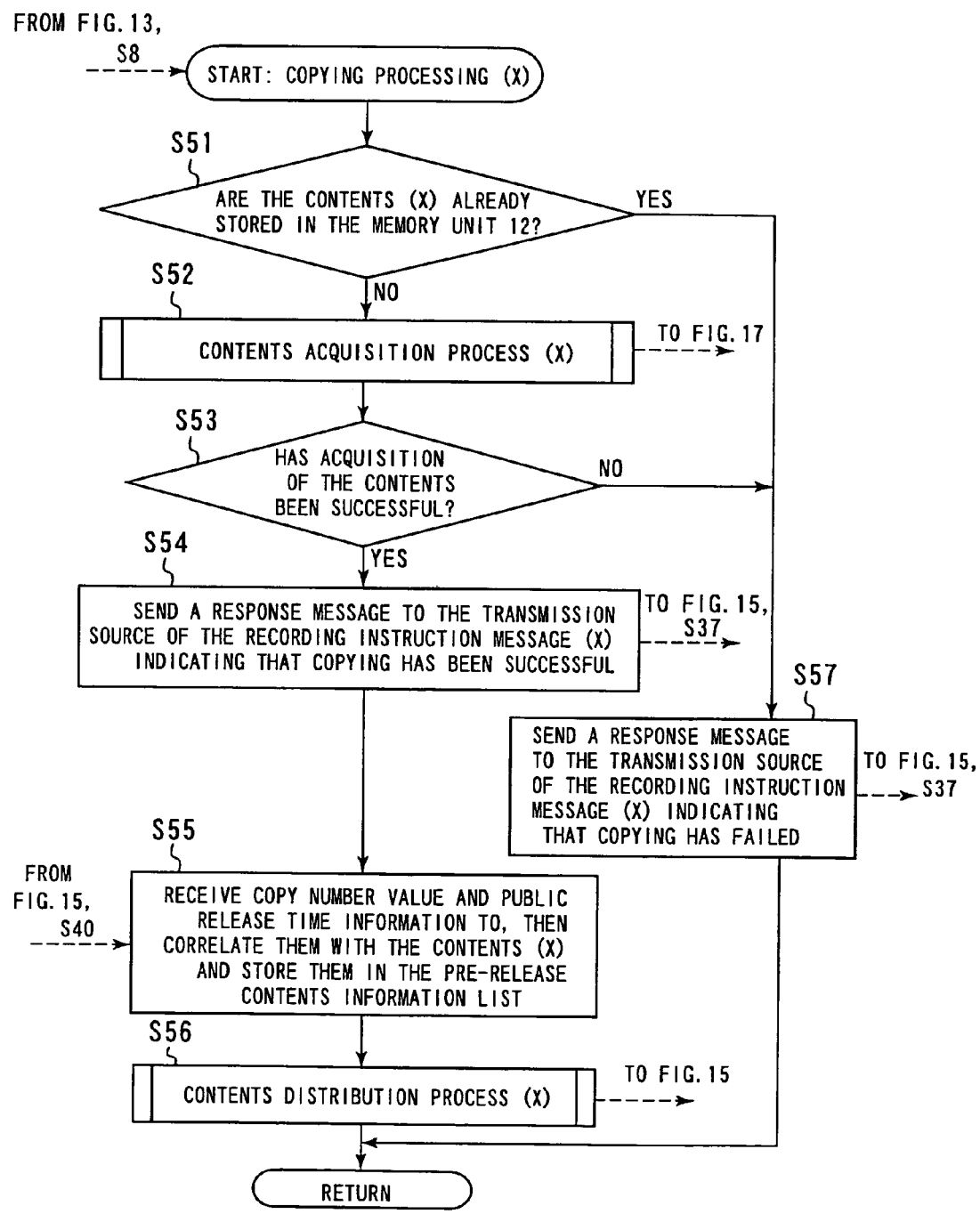
FIG. 16 is a flowchart showing the processing in a first embodiment of the invention for creating copies.

Next, the flowchart shown in FIG. 16 will be used to explain the 'copying process' in step S8 mentioned above in '1. Basic Node Processing'.

First, the node N determines whether or not the contents (X) are stored in the memory unit 12 (step S51), and when the contents (X) are not stored (step S51: No), executes the 'contents acquisition process' for the contents (X), which is the object of the recording instruction (step S52), and when acquisition of the contents (X) by that process was successful (step S53: Yes), sends a response message to the source of the recording instruction message indicating that copying was successful, and notifies the source of the recording instruction message that recording was successful (step S54).

Moreover, the node N receives the public release time information To(X) and the copy number VALUE from the node that was the source of the recording instruction message, correlates the values with the contents (X) and stores them in the 'Pre-release contents information list' of the memory unit 12 (step S55), then executes the 'contents distribution process (X)' itself (step S56). The 'contents distribution process (X)' is performed as described above in '1.2 Contents Distribution Process'.

However, in the processing of step S51, when the contents (X) are already recorded in the memory unit 12 (step S51: Yes), and in the processing of step S53 when acquisition of the contents (X) failed (step S53: No), sends a response message to the source of the recording instruction message that copying failed (step S57).

As described above, in step S51, when the contents (X) for which a recording instruction was given are already recorded, by sending a message that recording failed to the source of the recording instruction message, the source of the recording instruction message can send the recording instruction to another node N, so it is possible to distribute the contents.

<1-4. Contents Acquisition Process>

Figure 17:
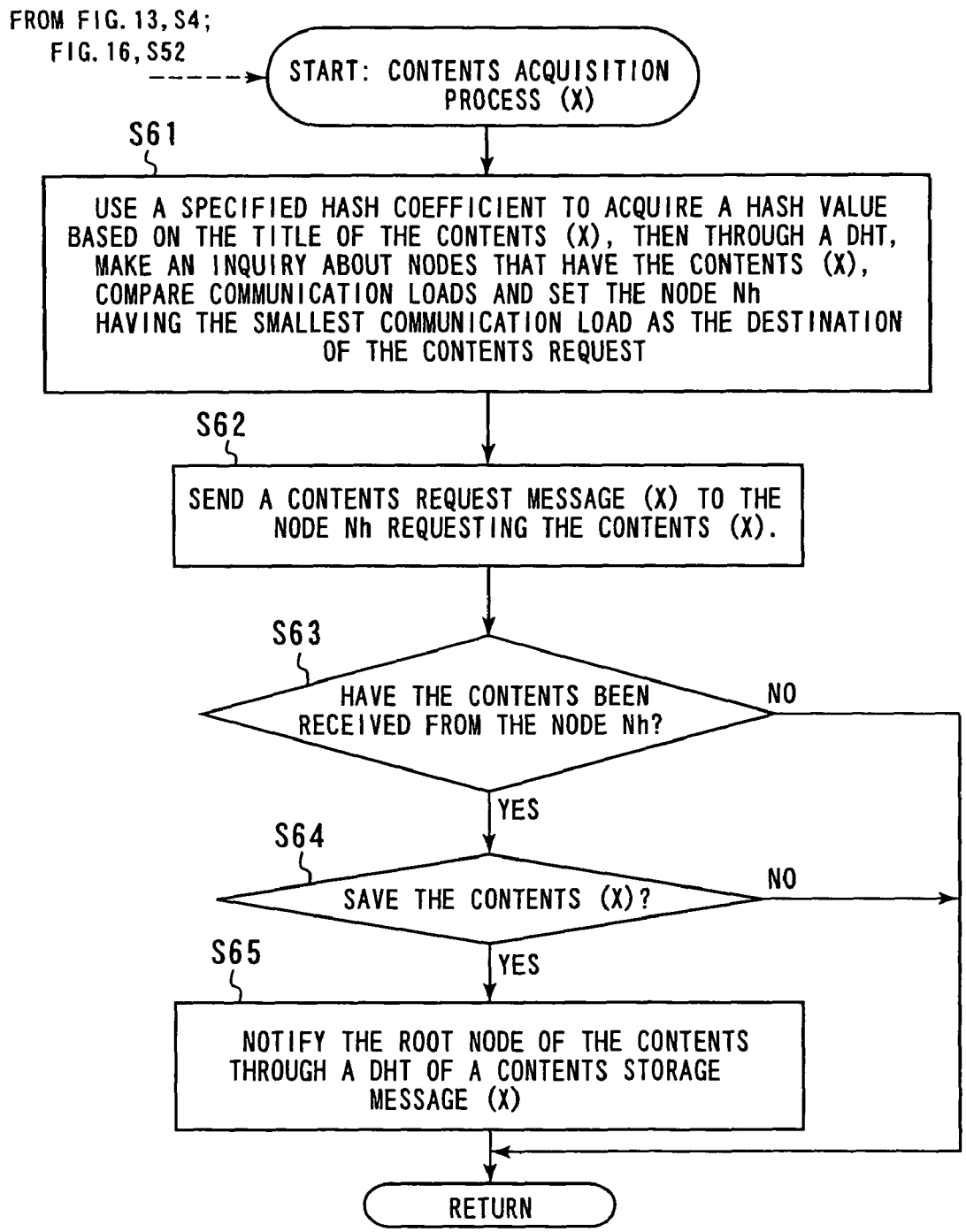
FIG. 17 is a flowchart showing the processing in a first embodiment of the invention for acquiring contents.

Next, the flowchart shown in FIG. 17 will be used to explain the 'contents acquisition process' in step S13 mentioned above in '1. Basic Node Processing', and in step S52 mentioned above in '1.3 Copying Process'. In step S13, the contents acquisition process is a process of acquiring contents that have already been made public, and in step S52, the contents acquisition process is a process of acquiring contents that have not yet been made public. Both processes have the point of requesting and acquiring contents from a node that stores the contents in common, so the processes will be explained using one flowchart.

First, the node N uses a specified hash coefficient to acquire a hash value based on the title of the contents (X), and from DHT routing makes and inquiry of the nodes that have the contents (X), then compares the communication loads of the of the communication paths between itself and each of the nodes and acquires the address of the node Nh that has the smallest communication load (step S61).

When acquiring contents that are already public (processing of step S4), the address of the node N having the contents (X) to be acquired is obtained from the root node that manages the location of the contents (X), however, in the case of processing based on a recording instruction message (processing of step S52), the address of the node having the contents (X) is similarly obtained from the root node that manages the location of the contents (X) for which there was the recording instruction, and the node accesses that node N.

When there is a plurality of nodes N that have the contents (X), the addresses of a plurality of nodes are obtained from the root node. In that case, one node Nh that is connected via a communication path having a relatively small communication load is set from among the plurality of nodes N as the request destination for requesting the contents (X).

The communication load can be considered to be smaller the fewer the number of hops (number of relay devices there are in the communication path) there are that is acquired from the reduced amount of TTL fields in packets when exchanging signals among the plurality of nodes N, or can be set based on delay time (msec) or effective bandwidth (Mbps).

The node N sends a contents request message (X) requesting the contents (X) to the node Nh that was set in this way as the contents request destination (step S62).

When the contents (X) that were transmitted from the node Nh that received the contents request message (X) have been received (step S63: Yes), the node N confirms that the contents (X) have been saved in the memory unit 12 (step S64: Yes), and through DHT routing notifies the root node of the contents (X) that the contents (X) have been stored (step S65), and ends processing.

However, in the processing of step S63, when it is not possible to confirm that the contents (X) have been received from the node Nh (step S63: No), and in the processing of step S64, when it is not possible to confirm that the contents (X) have been saved (step S64: No), the node N ends processing as is.

As was explained above, it is possible to have a plurality of nodes N store contents in advance before the contents are made public, and to distribute those contents in a system, so even after the contents have been made public and there are requests to a plurality of nodes at the same time requesting distribution of the contents, since a plurality of nodes contained the contents beforehand, it is possible to distribute the contents comparatively smoother between respective P to P than in case of when only one node contained the contents even immediately after being made public.

As was explained in step S35 above, the nodes instructed to record the contents are selected at random, so it is possible to make copies uniformly over the entire network.

Moreover, as was explained in step S61, the node that was instructed to record the contents is such that it receives the contents from a node among the nodes having the contents that are the object of the recording instruction that is closest to itself and which path load is relatively small, so it is possible to make copies while controlling the communication load of the entire system.

Furthermore, as was explained in step S21, a user that desires to make contents public can set the number of copies of the contents to be distributed as a copy number VALUE, and thus it is possible to provide a system that is easy for the user to use.

As was explained in step 40, by dividing up a number of copies among nodes as copying destinations, it is possible for a plurality of nodes to perform the work of distributing the contents, and thus the work of distributing the contents before being made public can be carried out more efficiently.

Moreover, as was explained in steps S37, S54 and S57, the node that gave the recording instruction is notified of the completion of copying the contents as a response message, so it is possible for the user on the side of the node that gave the recording instruction to know that copying was performed as instructed. Also, in step S51, a node that already has the same contents sends a response indicating that recording failed, so it is possible to distribute the initially set number of copies of contents as planned among a plurality of nodes.

Furthermore, in step S65, the root node that is the managing device that manages the location of the contents (X) is notified that the contents (X) are stored, so after the contents are made public, the root node is able to correspond to requests to distribute the contents comparatively smoothly.

II. Second Embodiment

In the first embodiment described above, the number of copies to be made before making contents public (number of copies) was used as an evaluation value indicating the copying adaptability of contents, however, in this embodiment, construction is such that the number of accesses within a specified about of time after contents have been made public (predicted access number), and the public release preparation period E of the contents are used to define a more stringent evaluation value, and a time (copying start time) is set at which the nodes N are to execute the contents distribution process, so that execution of that process is not executed at the same time by a plurality of nodes N within the system.

In all of the processes described for this embodiment, computation of time periods is performed, however, when performing those computations common units are used (seconds, minutes, days, weeks, months, years).

<2. Basic Node Processing>

Figure 18:
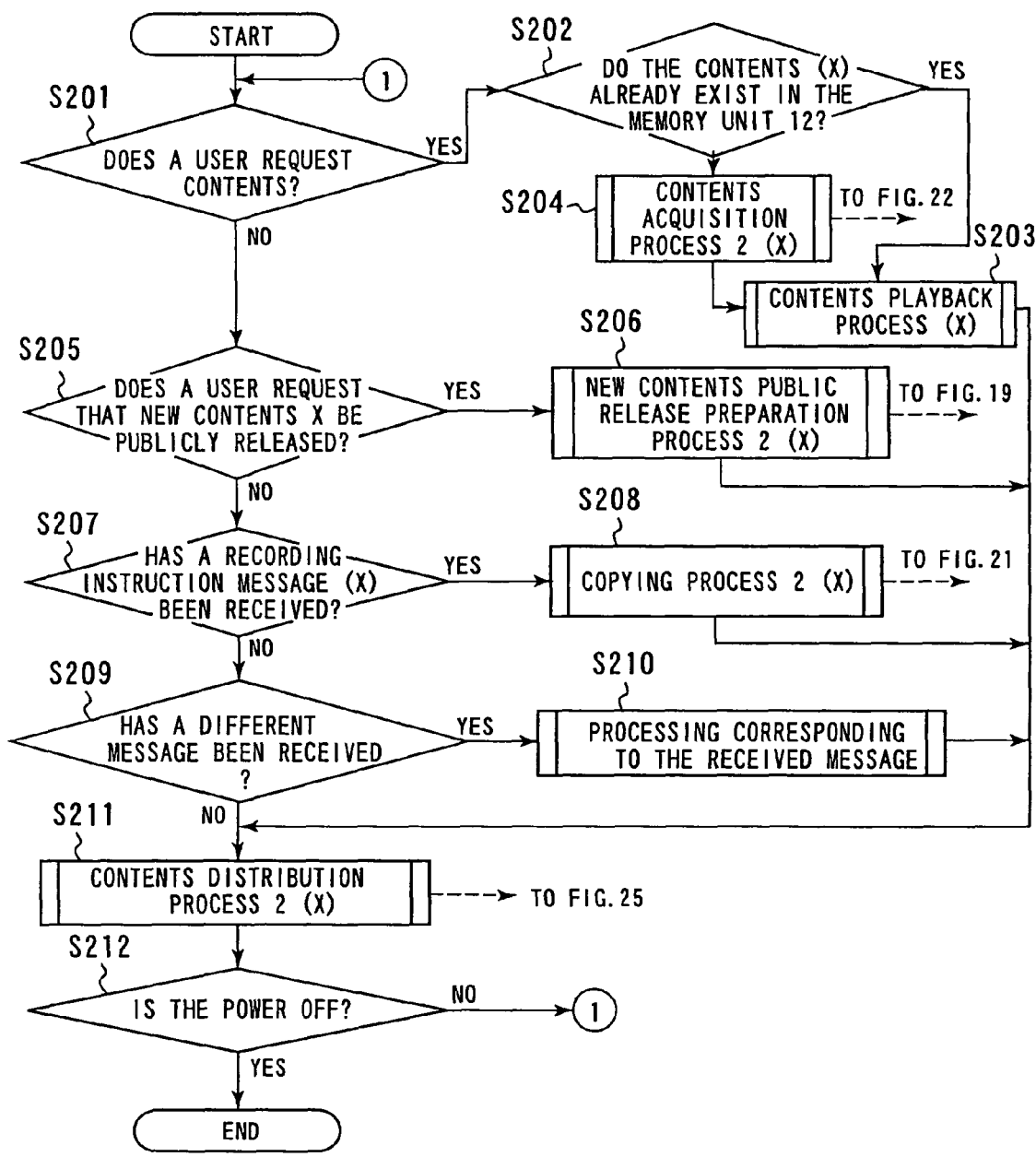
FIG. 18 is a flowchart showing the basic processing in a second embodiment of the invention.

A flowchart of the basic processing by each of the nodes N in this embodiment is shown in FIG. 18, however, the processing of step S201 to step S210 and step S212 is the same as the processing of step S1 to S10 and step S13 in the flowchart for the first embodiment described above and shown in FIG. 8, so an explanation of them will be omitted here.

The construction of this embodiment differs from that of the first embodiment in that before confirming that the power is OFF in step S212, instead of publicly releasing contents for which the public release date has passed and deleting them from the list, a 'contents distribution process 2' is executed (step S211). This process will be explained in detail later.

<2-1. Contents Registration Process>

Figure 19:
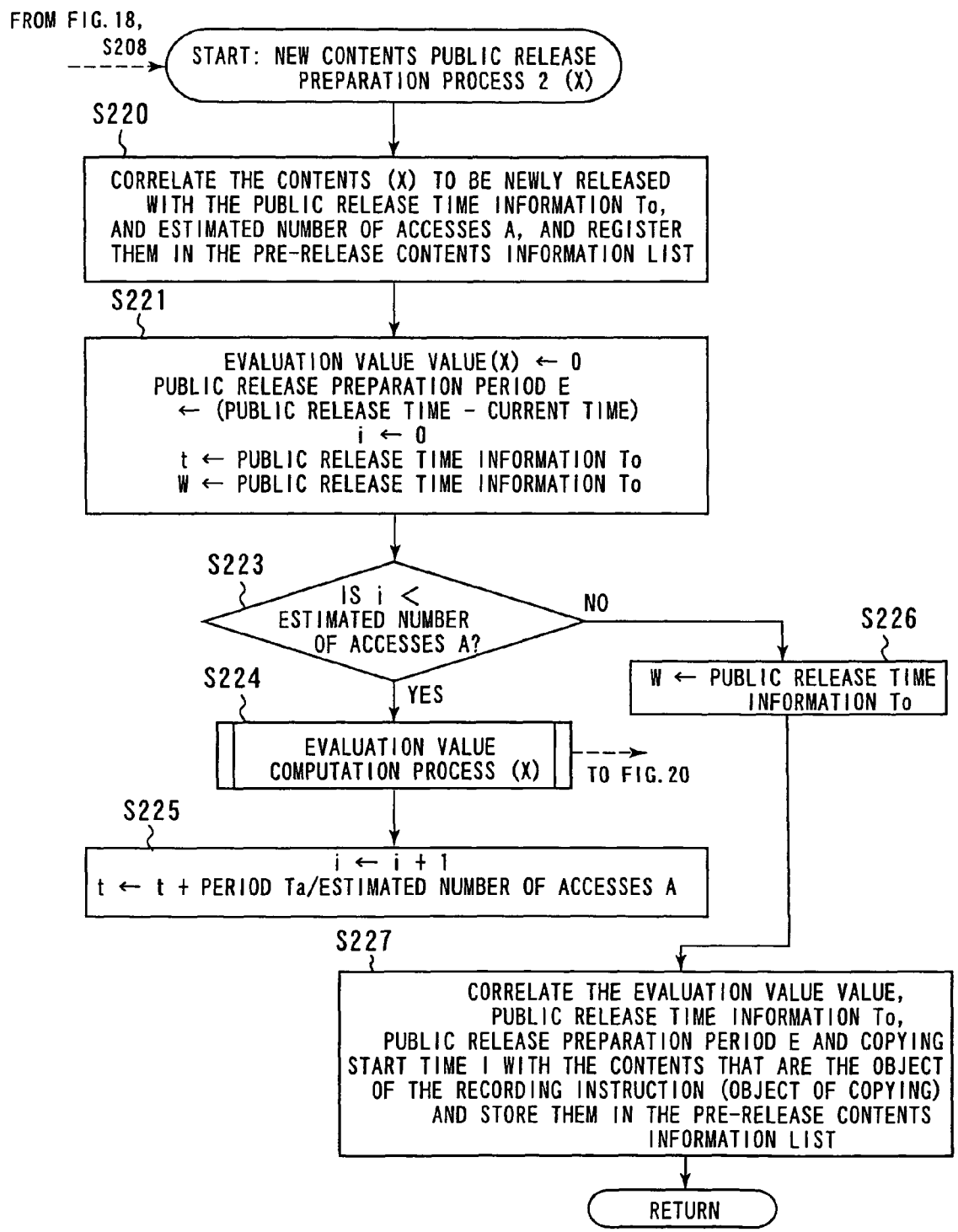
FIG. 19 is a flowchart showing the processing in a second embodiment of the invention for preparing to make public new contents.

Next, the flowchart shown in FIG. 19 will be used to explain the process in step S206 of '2. Basic Node Processing' mentioned above of placing new contents into a distribution system to be shared in the system (new contents public release preparation process 2 (X)).

First, the contents (X) to be newly released are correlated with various kinds of information and registered in the 'new contents list (see Table 2) of the memory unit 12 (step S201). More specifically, by operating the input unit 20, the user of the node N inputs the public release time information To for the contents (X), and the estimated number of accesses A during a period of time Ta from public release (for example, the period Ta could be one week), and correlates that information with the contents (X) and registers the information.

TABLE 2

| | CORRESPONDING INFORMATION | |
|---|---|---|
| CONTENTS DATA | PUBLIC RELEASE TIME INFORMATION TO | ESTIMATED NUMBER OF ACCESSES A (DURING PERIOD TA) |
| CONTENTS (X1) | TO (X1) | A (X1) |

Next, an evaluation VALUE (X) is set to '0' (zero), the value obtained by subtracting the current time from the public release time that is indicated in the public release time information of the contents (X) is taken to be the public release preparation period E, a variable 'i' is set to '0' (zero), and the values of a parameter W and variable t are initialized as the public release time information To (step S221).

The parameter W is the number of copies used for adjusting the evaluation value of the contents (X) for the entire distribution system of the embodiment, and is generated when a replica (copy) of the contents (X) stored in the transmission source node N is created in the transmission destination node N, and before public release, the public release time information To is included in a copying message as parameter W. From this, in the first evaluation value acquisition and computation process, which corresponds to the number of accesses after public release, and that is executed when the node N that received the recording instruction to record contents (X) sends and receives contents (X) among other nodes N, it is possible to use the public release time information To first as the parameter W that indicates the 'time the evaluation value VALUE (X) was last acquired' for the contents (X), so it is possible for processing to smoothly advance from the processing before public release to the processing after public release.

The inventors of the present invention append a patent application (Japanese patent application 2005-095639) here that is related to a method for computing an evaluation value according to the number of accesses of each node N after contents are made public, and since the method for computing the evaluation value after public release is given in detail in that specification, an explanation of it will be omitted here.

Next, the node N determines whether or not the variable 'i' is less than the estimated number of accesses A (step S223), and when it is determined that the variable 'i' is less than the estimated number of accesses (step S223: Yes), the node N performs the 'evaluation value computation process (X)' (step S224), then adds '1' to the variable 'i', and after adding the value obtained by dividing the time period Ta by the estimated number of accesses A to the variable 'i' (step S225), the node N returns to step S223 and performs judgment again. The 'evaluation value computation process (X)' will be explained later using a flowchart.

The value obtained by dividing the time period Ta by the estimated number of accesses A in the process of step S225, or in other words when the public release time for the contents (X) that were sent to node N is reached and the contents (X) are made public, this value is defined as the estimated frequency that the contents (X) are accessed during a period Ta after being made public (for example 1 time per hour, or 1 time per 10 seconds).

On the other hand, in the processing of step S223, when the estimated number of accesses A is determined to be equal to or greater than the variable 'i' (step S223: No), the node N resets the parameter W that was changed in the 'evaluation value computation process (X)' (explained later) to the public release time information To (step S226).

Next, the node N correlates the public release time information To, evaluation value VALUE, public release preparation period E and copying start time I with the contents (X) that are the object of the recording instruction, and records them in the 'Pre-release contents information list' (see Table 3) in the memory unit 12 (step S227), then ends processing.

TABLE 3

| | CORRESPONDING INFORMATION | | | |
|---|---|---|---|---|
| CONTENTS DATA | PUBLIC RELEASE TIME INFORMATION TO | PUBLIC RELEASE PREPARATION PERIOD E | COPY NUMBER VALUE VALUE | COPYING START TIME I |
| CONTENTS (X1) | TO (X1) | E (X1) | VALUE (X1) | I (X1) |
| CONTENTS (X2) | TO (X2) | E (X2) | VALUE (X2) | I (X2) |
| CONTENTS (X3) | TO (X3) | E (X3) | VALUE (X3) | I (X2) |
| . | . | . | . | . |
| . | . | . | . | . |
| . | . | . | . | . |
| CONTENTS (Xn) | TO (Xn) | E (Xn) | VALUE (Xn) | I (Xn) |

<2-2. Evaluation Value Computation Process>

Figure 20:
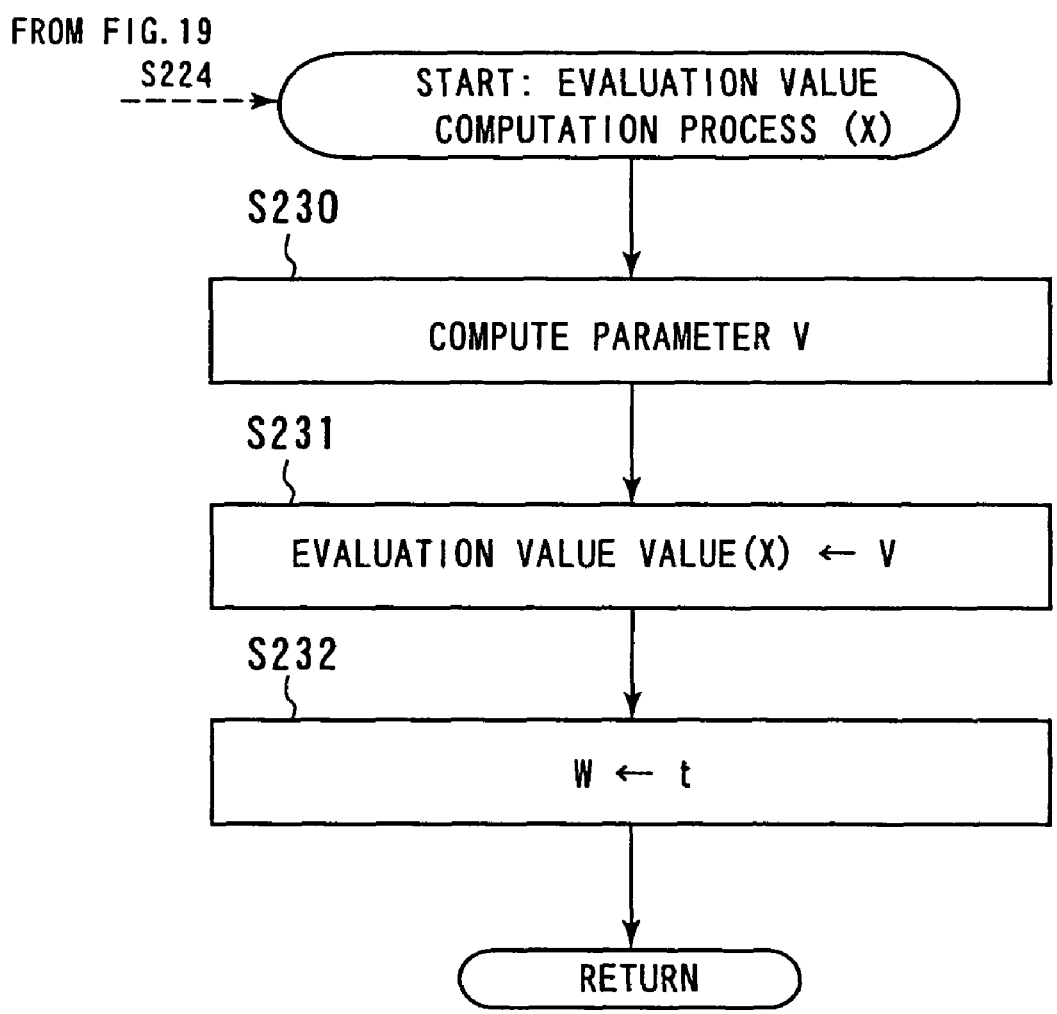
FIG. 20 is a flowchart showing the processing in a second embodiment of the invention for calculating an evaluation value.

Next, the flowchart shown in FIG. 20 will be used to explain the 'evaluation value computation process' in step S224 of '2-1. Contents Recording Process' above.

First, the node N computes and acquires the parameter V according to the equation below based on the current evaluation value VALUE (X) and the current parameter W for the contents (X) (step S230).

$$V = \text{VALUE}(X) \times d^{\wedge}(t-W) + 1 \qquad (1)$$

Here, 'd' is a damping parameter having a value from 0 to 1 and indicates the ratio that the evaluation is damped per unit time, and it is used as is even after the public release.

In Equation (1), the term (t−W) indicates the time that has elapsed from the previous access time up until the time t. This time t is the 'current time' in processing after public release, however, in this evaluation value computation process before public release, by taking the time t to be a future time, the evaluation value is calculated before public release of the contents for a time after public release of the contents. Therefore, in Equation (1), VALUE (X)×d^(t−W) is the evaluation value at time t, and by adding '1' for the current access, the equation becomes Equation (1) above for acquiring the parameter V.

The node N then updates the parameter V that is acquired as described above as the new evaluation value VALUE (X) for the contents (X) in the 'Pre-release contents information list' (step S240).

For example, in Equation (1) above, the damping parameter d is set so that after every hour the evaluation value is damped by 10%, and three hours have elapsed since the previous evaluation value computation process (X), so the parameter V is acquired using Equation (1) as shown in Equation (2) below.

$$V = \text{VALUE}(X) \times 0.9^{\wedge}1 \qquad (2)$$

The node N ends processing after the parameter W is taken to be the variable t (step S232).

<2-3. Copying Process 2>

Figure 21:
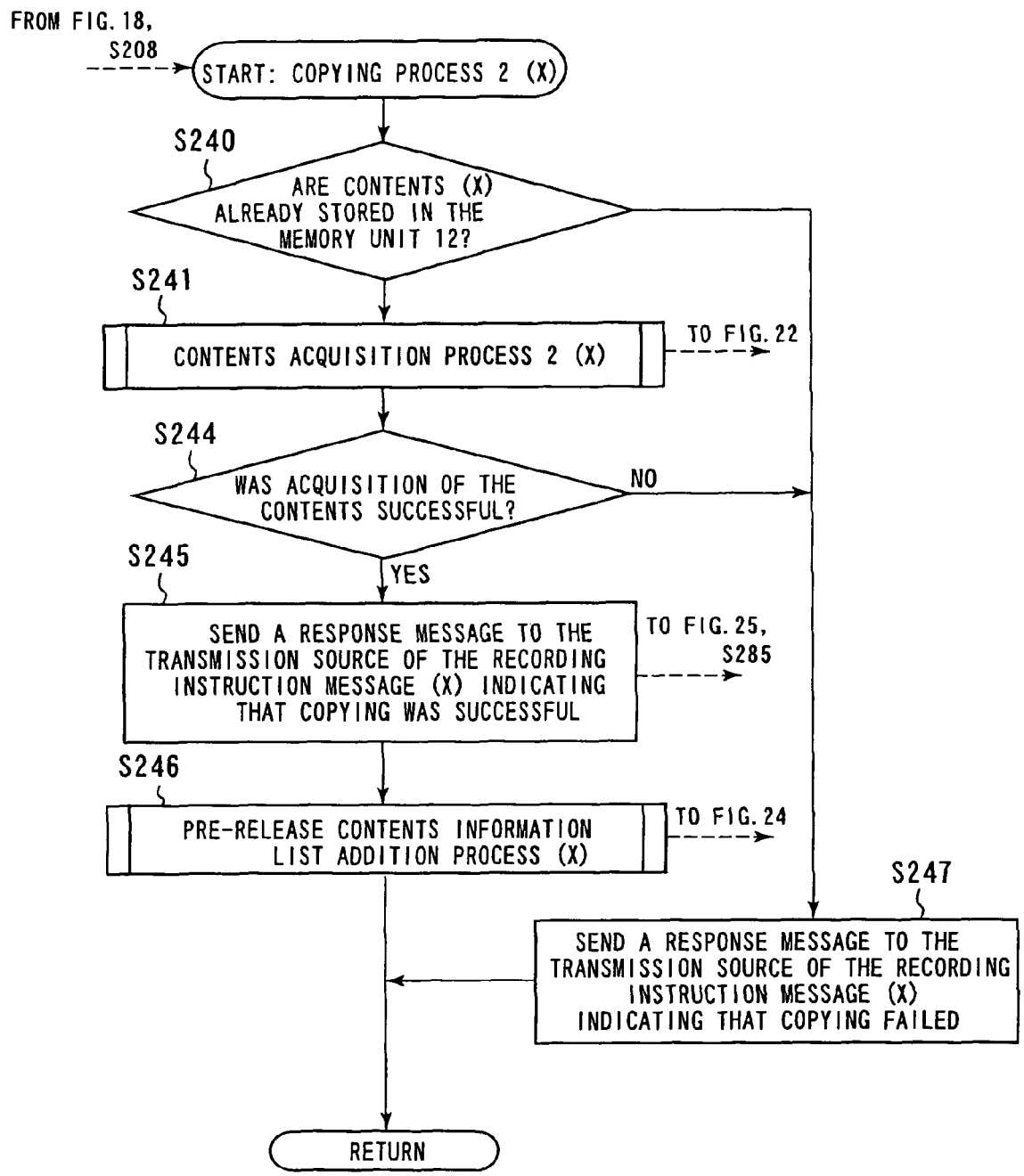
FIG. 21 is a flowchart showing the processing in a second embodiment of the invention for creating copies.

Next, the flowchart shown in FIG. 21 will be used to explain the 'copying process 2' in step S208 of '2. Basic Node Processing' above.

First, the node N determines whether or not the contents (X) are already stored in the memory unit 12 (step S240), and when the contents (X) are not stored in the memory unit 12 (step S240: No), the node N executes the 'contents acquisition process 2' for the contents (X) that are the object of the recording instruction (step S241), and when the contents (X) are successfully acquired by that process (step S241: Yes), the node N sends a response message to the source of the recording instruction message indicating that copying was successful to notify that recording was successful as instructed (step S245).

The node N then executes a 'Pre-release contents information list addition process (X) (step S246), then ends processing. The 'Pre-release contents information list addition process (X)' will be explained later using a flowchart.

On the other hand, in step S240, when the contents (X) are already recorded in the memory unit 12 (step S240: Yes), and in step S244, when acquisition of the contents (X) failed (step S244: No), the node N sends a response message to the source of the recording instruction message indicating that copying failed (step S247), then ends processing.

As was described above, in step S240, when the contents (X) for which there was a recording instruction are already recorded, by sending a message indicating that recording failed to the source of the recording instruction message, the source of the recording instruction message can resend the recording instruction message to another node N, so it is possible to distribute the contents.

<2-4. Contents Acquisition Process 2>

Figure 22:
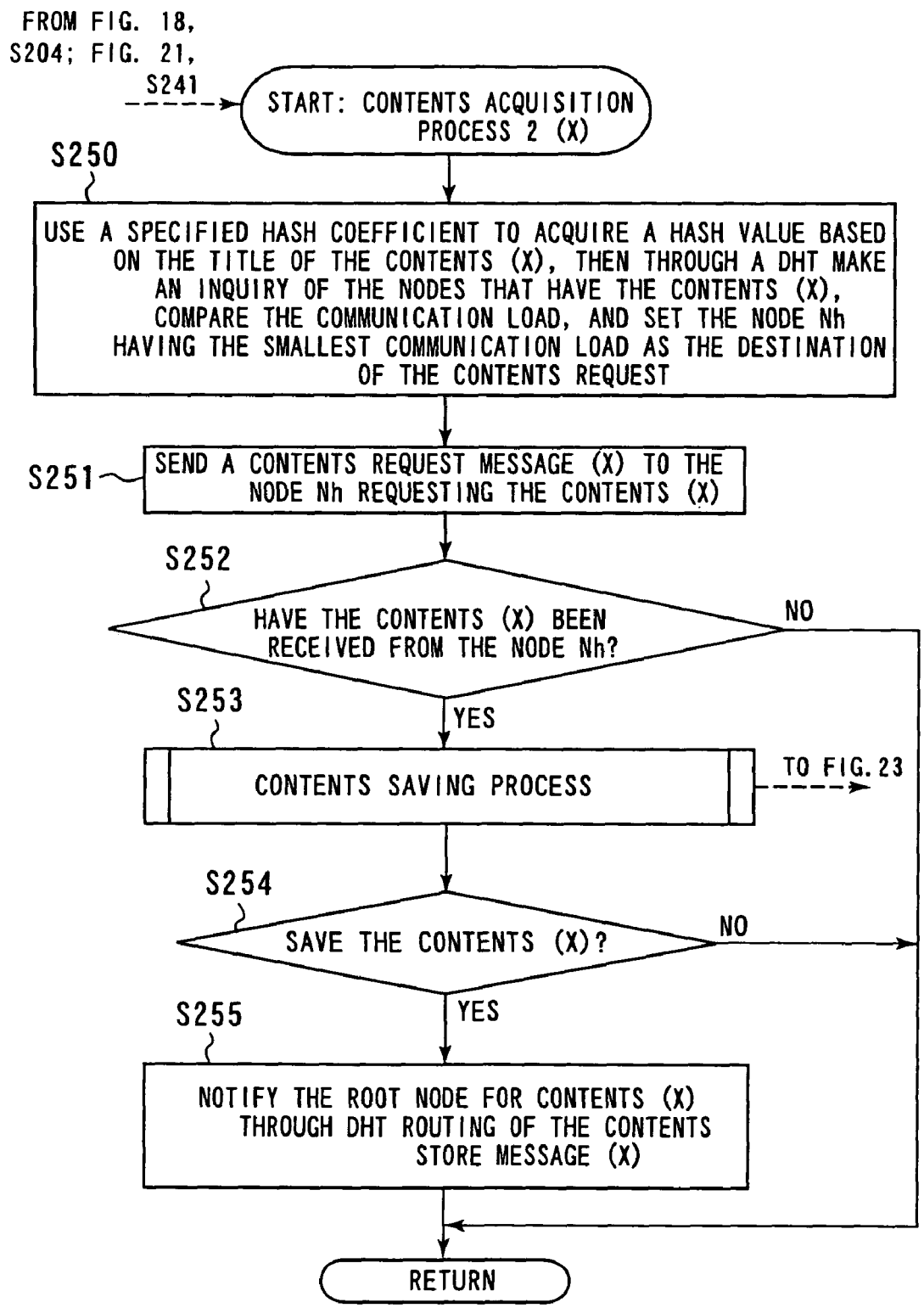
FIG. 22 is a flowchart showing the processing in a second embodiment of the invention for acquiring contents.

Next, the flowchart shown in FIG. 22 will be used to explain the 'contents acquisition process 2' in step S204 of '2. Basic Node Processing' and step S241 of '2-3. Copying Process 2' above. The contents acquisition process in step S204 is a process for acquiring contents that have already been made public, and the contents acquisition process in step S241 is the process of the present invention of acquiring contents before public release. In either process, the process of requesting and acquiring contents from a node that has the contents is the same, so it is possible to explain these processes using one process flowchart.

First, the node N uses a specified hash coefficient to acquire a hash value based on the title of the contents (X), and through DHT routing, makes an inquiry of the nodes having the contents (X), then compares the communication loads of the communication paths between itself and each of the node, and acquires the address of the node Nh having the smallest communication load (step S250).

Details of the processing in step S250, such as comparison of the communication loads, is the same as that performed in step S61 of the first embodiment 1, so an explanation is omitted here.

The node N sends a contents request message (X) to the node Nh, which was set as the contents request destination, requesting the contents (X) (step S251).

After receiving the contents (X) that were transmitted from the node Nh that received the contents request message (X) (step S252: Yes), the node N executes the 'contents saving process (X)' (step S253), and after confirming that the contents (X) have been saved in the memory unit 12 (step S254: Yes), through DHT routing notifies the root node for the contents (X) that the contents have been saved (step S255), then ends processing. The 'contents saving process' in step S253 will be explained in detail later.

On the other hand, in the processing of step S252, when it is not possible to confirm that the contents (X) have been received from the node Nh (step S252: No), and in the processing of step S254, when it is not possible to confirm that the contents (X) have been saved (step S254: No), the node N ends processing.

<2-5. Contents Saving Process>

Figure 23:
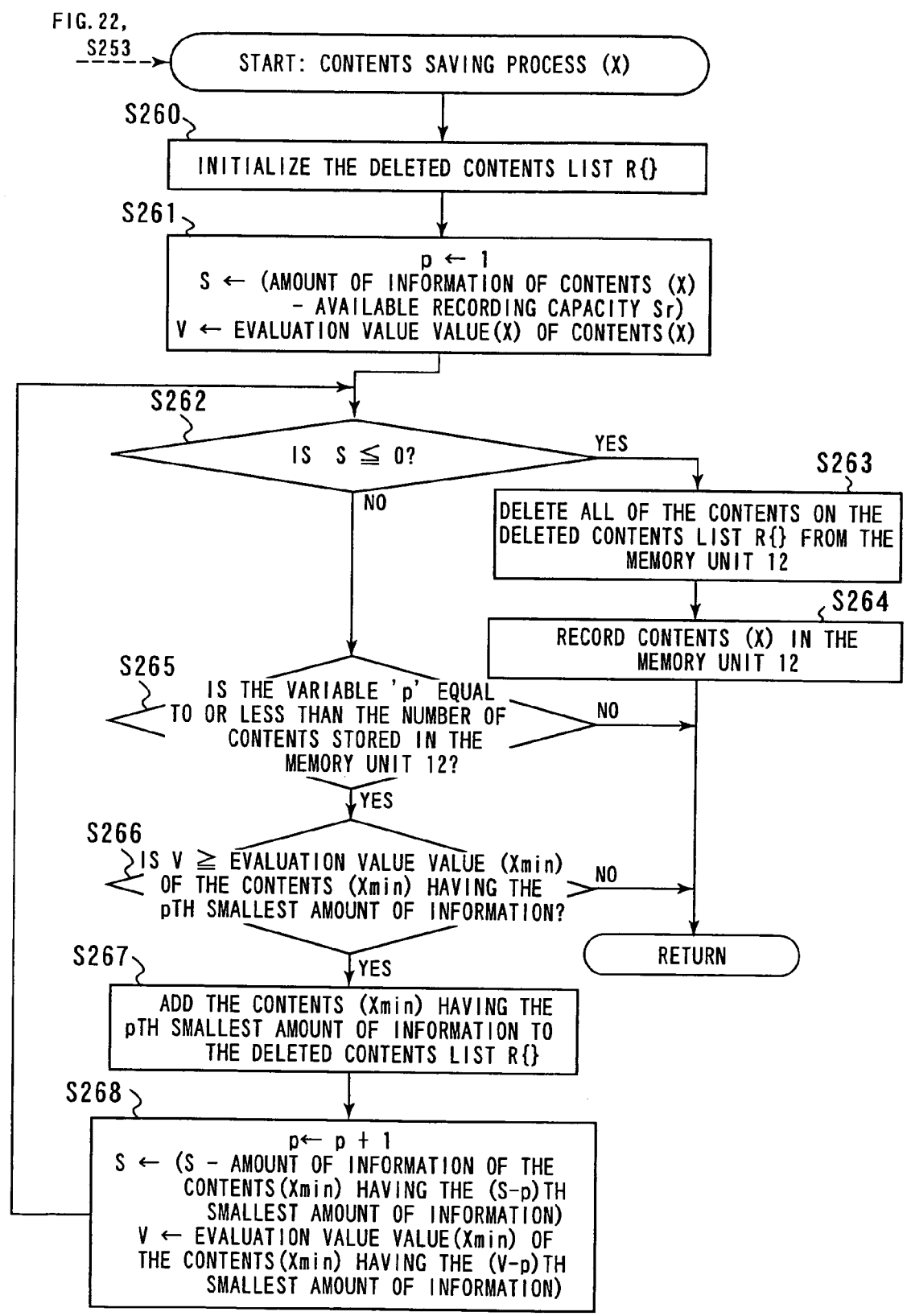
FIG. 23 is a flowchart showing the processing in a second embodiment of the invention for saving contents.

Next, the flowchart shown in FIG. 23 will be used to explain the 'contents saving process' in step S253 above.

First, the node N creates a deleted contents list { } in the memory unit 12, and empties and initializes that list (step S260). Then the node N defines a variable 'p' to be 1, defines the value that is obtained by subtracting the empty recording area Sr, which is the area in the memory unit 12 for recording contents where contents are not yet recorded, from the amount of information (data amount) of the contents (X) that are the object of the recording instruction that is received in the processing of step S252 as a parameter S, and defines the evaluation value VALUE (X) of the contents (X) as parameter V (step S261).

Next, the node N determines whether or not the parameter S is '0' (zero) or less (step S262), and when it is determined that parameter S is '0' or less (step S262: Yes), deletes all of the contents of the deleted contents list R{ } (step S263), then records (stores) the contents (X) that were received in step S252 in the 'Pre-release contents information list' of the memory unit 12 (step S265) and ends processing.

However, in step S262, when it is determined that parameter S is not '0' or less (step S262: No), it means that the empty recording capacity Sr is not equal to or greater than the amount of information of the contents (X), so the node N continues processing for creating empty recording capacity Sr.

First, the node N determines whether or not the variable 'p' is equal to or less than the number of contents (number of items) stored in the memory unit 12 (step S265). When the variable 'p' is equal to or less than the number of contents (number of items) stored in the memory unit 12 (step S265: Yes), the node N then determines whether or not the value of parameter V is less than the evaluation value VALUE(Xmin) of the contents (Xmin) having the pth (variable p) smallest amount of information (step S266). Here, after the contents have been made public, each contents data and an evaluation value VALUE that corresponds to the contents data are registered in the memory unit 12 as shown in Table 4.

TABLE 4

| CONTENTS DATA | CORRESPONDING INFORMATION EVALUATION VALUE |
|---|---|
| CONTENTS (X1) | VALUE (X1) |
| CONTENTS (X2) | VALUE (X2) |
| CONTENTS (X3) | VALUE (X3) |
| . | . |
| . | . |
| . | . |
| CONTENTS (Xn) | VALUE (Xn) |

After, contents have been made public, the evaluation value VALUE(Xmin) is such that it increases every time the contents are accessed (every time there is a distribution request), so contents having a low evaluation value VALUE are contents that have been accessed few times, and being regarded as being unpopular contents, are the most suitable for being deleted. Variation in the evaluation value VALUE due to access after the public release is described in detail in the aforementioned Japanese patent application (Japanese patent application 2005-095639), so an explanation of it will be omitted here.

When the evaluation value VALUE (Xmin) is equal to or less than the value of parameter V (step S266: Yes), the node N adds the contents (Xmin) having the pth smallest amount of information to the deleted contents list R{ } (step S267).

Next, the node N adds 1 to the variable 'p', sets the value obtained by subtracting the amount of information of the contents (Xmin) having the pth smallest amount of information from parameter S as the new parameter S, and sets the value that is obtained by subtracting the evaluation value VALUE (X) of the contents (Xmin) having the pth smallest amount of information from parameter V as the new parameter V (step S268), then proceeds to step S262.

In the processing from step S262 to step S269 described above, the total of the evaluation values of the contents to be deleted (deleted contents list R{ }) is not allowed to drop below the evaluation of the contents (X) for which there is a recording instruction.

On the other hand, in step S265, when the variable 'p' is less than the number of contents (number of items) that are stored in the memory unit 12 (step S265: No), that is, when the storage capacity of the memory unit 12 is small to start with, or when the amount contents (X) for which there is a recording instruction is very large, there are no contents in the memory unit 12 that can be deleted, so the received contents (X) cannot be recorded, and the node N ends processing without deleting any contents in the deleted content list R{ } from the memory unit 12.

Moreover, in the case where the node N determines that the value of parameter V is less than the evaluation value VALUE (Xmin) (step S266: No) as well, the received contents (X) are similarly not recorded, and the node N ends processing without deleting any contents in the deleted content list R{ } from the memory unit 12. Therefore, construction can be such that when the evaluation value (corresponds to parameter V in this processing) of the contents for which there is a recording instruction is small, contents that are already recorded are not deleted.

<2-5. Pre-Release Contents Information List Addition Process>

Figure 24:
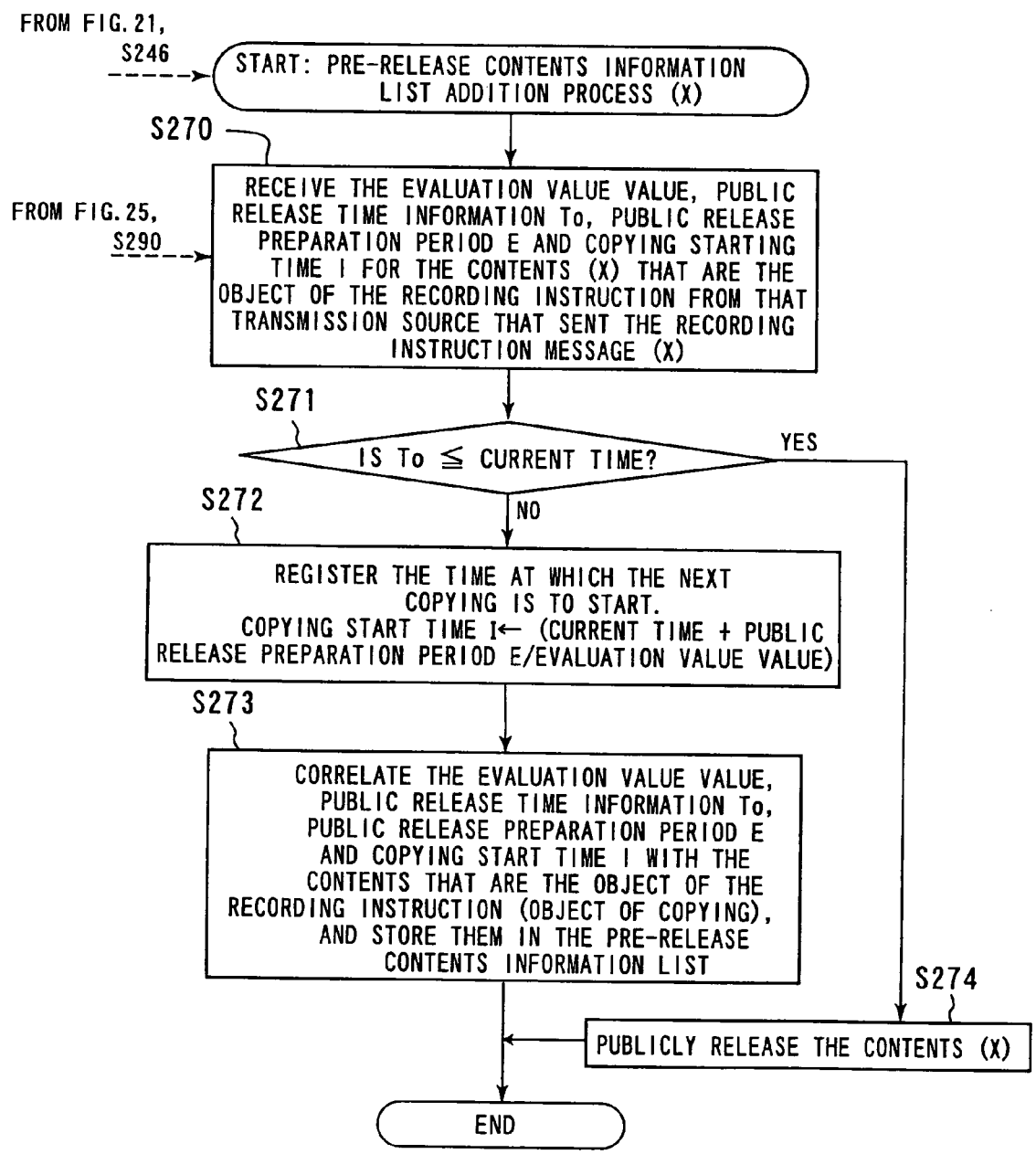
FIG. 24 is a flowchart showing the processing in a second embodiment of the invention for adding a list of contents information before being made public.

Next, the flowchart shown in FIG. 24 will be used to explain the 'Pre-release contents information list addition process' in step S246 of '2-3. Copying Process 2' above.

First, the node N receives public release time information To(X), public release preparation period E(X), copy number VALUE (X), and copying start time I(X) from the node that is the transmission source of the recording instruction message (step S270).

Next, the node N determines whether or not the current time has passed the public release time information To (step S271), and when the current time has not passed the public release time information To (step S271: No), then next in order to update the time when copying starts (copying start time I), the value that is obtained by dividing the public release preparation period E by the evaluation value VALUE is added to the current time, and the resulting value is defined as the new copying start time I (step S272).

The node N then correlates the contents which are the object of the recording instruction with the evaluation VALUE, public release time information To, public release preparation period E and copying start time I and stores them in the 'Pre-release contents information list' that is stored in the memory unit 12 (step S273), then ends processing.

However, in step S271, when the current time has passed the public release time information To (step S271: Yes), then the node N makes public the contents (X) (step S274) and ends processing.

<2-6. Contents Distribution Process 2>

Figure 25:
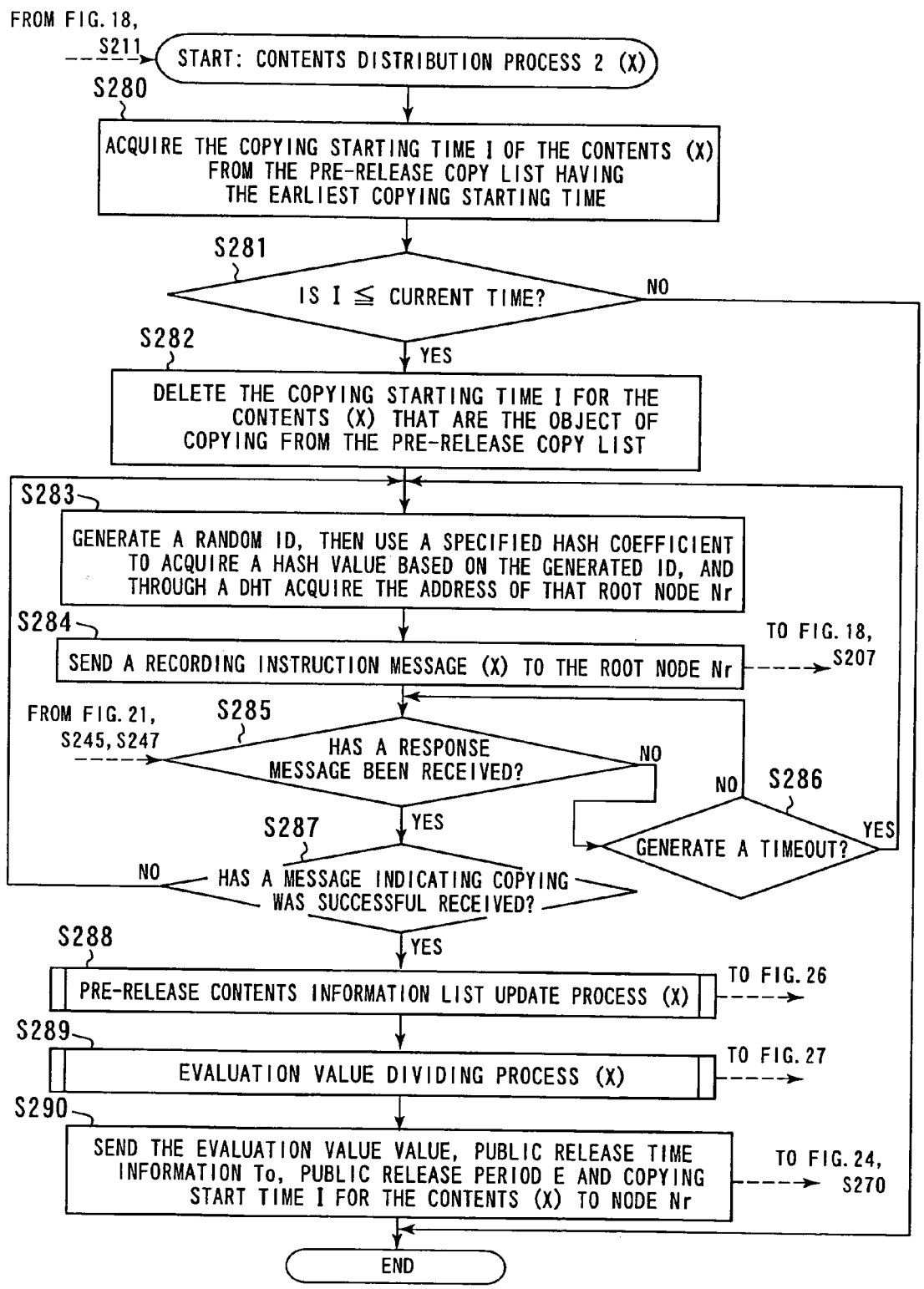
FIG. 25 is a flowchart showing the processing in a second embodiment of the invention for distributing contents.

Next, the flowchart shown in FIG. 25 will be used to explain the 'contents distribution process 2' in step S211 of '2. Basic Node Processing' above.

First, the node N acquires the copying start time I for the contents (X) having the earliest copying start time from the 'Pre-release contents information list' that is stored in the memory unit 12 (step S280).

Next, the node N determines whether or not the current time has passed the copying start time I (step S281), and when the current time has not passed the copying start time I (step S281: No), ends processing.

By controlling the time at which to distribute contents to the nodes according to the copying start time in this way, and by spreading out the timing at which processing is performed between nodes, it is possible to prevent adverse effects (for example, delay due to exchanging other messages) such as a increase in load on the entire system that may occur when the nodes in the distribution system start the process for distributing contents at the same time.

On the other hand, when the current time has passed the copying start time I (step S281: Yes), specified conditions for the contents (X) to be recorded are satisfied, so the node N deletes the copying start time I (X) for the contents (X) from the 'Pre-release contents information list' (step S282), then generates a random character string (ID), or acquires at random the title of arbitrary contents from the 'Pre-release contents information list' that is stored in the memory unit 12, uses a specified hash coefficient to acquire a hash value, then through DHT routing selects the root node Nr based on that hash value as the node to which the recording instruction is to be given, and acquires the address of that root node Nr (step S283).

Next, the node N sends a recording instruction message to the root node Nr (step S284), and confirms whether a response message is received from that root node Nr (step S285). When a response message has not been received (step S285: No) and a timeout occurs (step S286: Yes), the node N returns to step S283, where it selects at random another node N to resend a recording instruction to, and sends a recording instruction message to that other node N. The node N continues to wait for a response message until a timeout occurs.

However, when a response message is received (step S285: Yes), and when that response message is a message indicating that recording of the contents (X) was successful (step S287: Yes), the node N executes the 'Pre-release contents information list update process' and 'evaluation value division process' (steps S288, S289), then sends the evaluation value VALUE for the contents (X), the public release time information To, public release preparation period E and copying start time I to the node Nr (step S290) and ends processing. The evaluation value VALUE and copying start time I that are sent to the node Nr are the new evaluation value VALUE and copying start time I that are obtained by executing the 'Pre-release contents information list update process' and 'evaluation value dividing process'.

On the other hand, in the processing of step S287, when the response message from the root node Nr is not a message that indicates that recording was successful (step S287: No), the node N returns to step S283, and again selects at random another node N to send a recording instruction to, then sends a recording instruction message to that node N.

By doing this, it is possible to share the work of copying the contents together with a node that has newly stored (recorded) the contents.

<2-6. Pre-Release Contents Information List Update Process>

Figure 26:
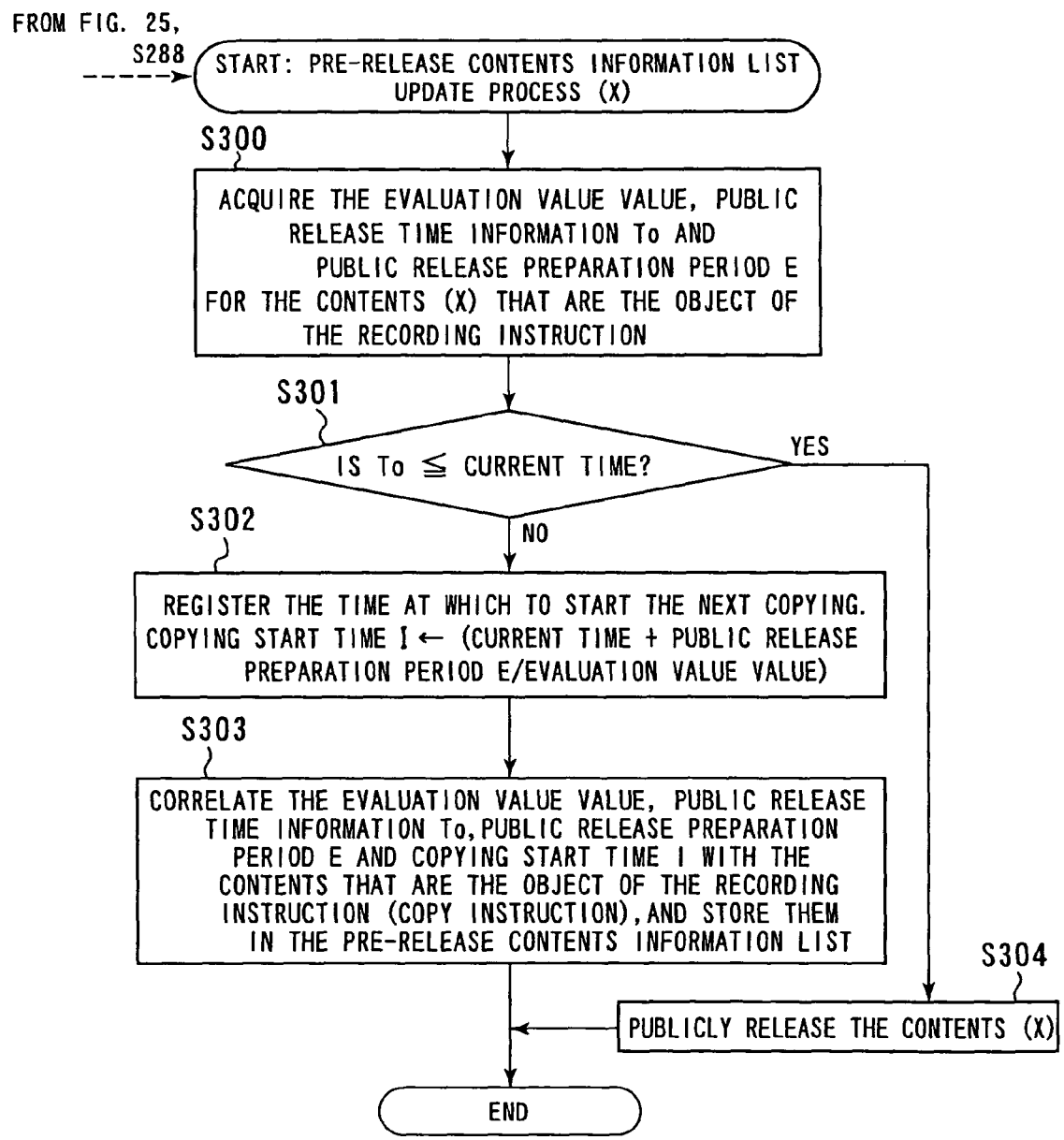
FIG. 26 is a flowchart showing the processing in a second embodiment of the invention for updating a list of contents information before being made public.

Next, the flowchart shown in FIG. 26 will be used to explain the 'Pre-release contents information list update process' in step S288 of '2-5. Copying Process 2' above.

First, the node N acquires the public release time information To(X), the public release preparation period E (X), copying value VALUE (X) and copying start time I(X) for the contents (X) which is the object of a recording instruction from the 'Pre-release contents list' (step S300).

Next, the node N determines whether or not the current time has passed the public release information time To (step S301), and when the current time has not yet passed the public release information time To (step S301: No), then in order to update the time at which to start the next copying (copying start time I), defines the value that is obtained by adding the value that is obtained from dividing the public release preparation period E by the evaluation value VALUE to the current time as the new copying start time I (step S302).

Moreover, the node N correlates the evaluation value VALUE, public release time information To, public release preparation period E and updated copying start time I with the contents that are the object of the recording instruction and stores them in the 'Pre-release contents information list' that is stored in the memory unit 12 (step S303), then ends processing.

On the other hand, in step S301, when the current time has passed the public release time information To (step S301: Yes), the node N makes the contents (X) public (step S304) and ends processing.

<2-7. Evaluation Value Dividing Process>

Figure 27:
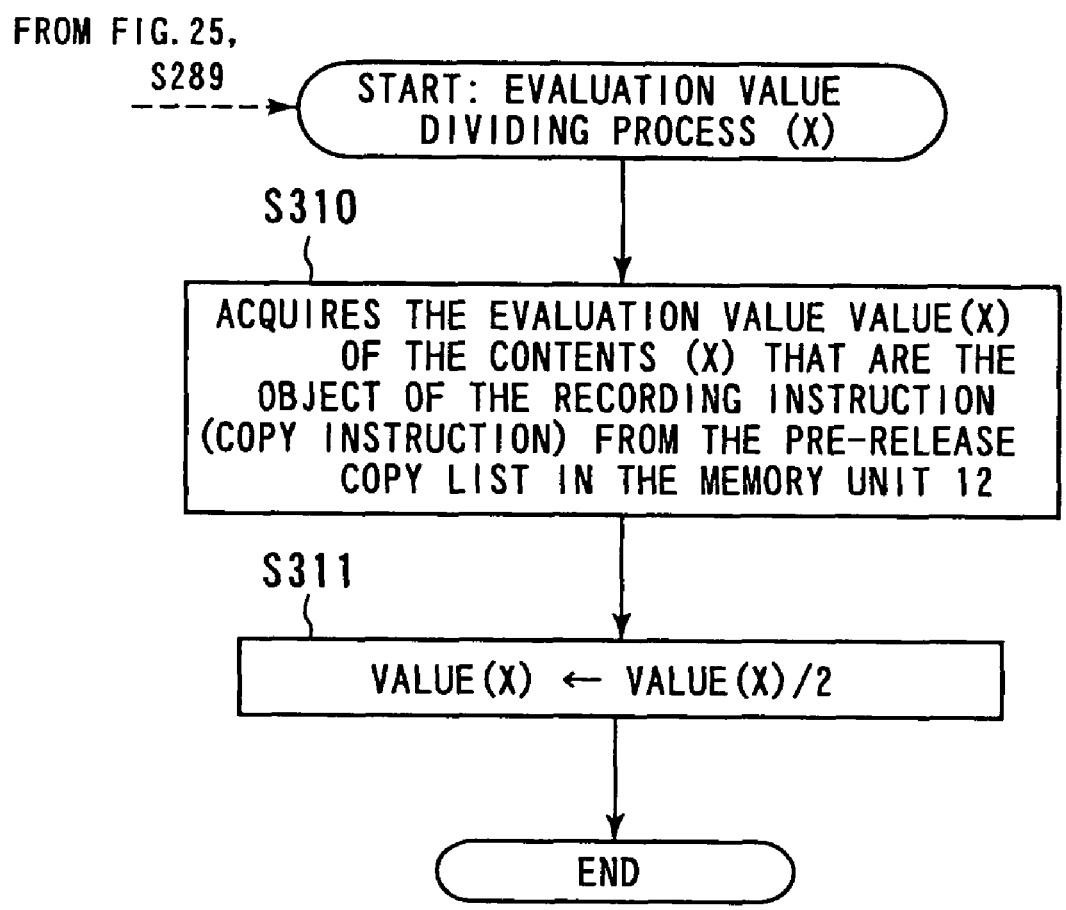
FIG. 27 is a flowchart showing the processing in a second embodiment of the invention for dividing up evaluation values.

Next, the flowchart shown in FIG. 27 will be used to explain the 'evaluation value dividing process' in step S289 of '2-5. Copying Process 2' above.

First, the node N acquires the evaluation value VALUE for the contents (X) that are the object of the recording instruction from the 'Pre-release contents information list' in the memory unit 12 (step S310). Then, the node N updates the acquired evaluation value VALUE so that it becomes small. In this embodiment, the node correlates the value obtained by dividing the acquired evaluation value VALUE by two with the contents (X) and stores it in the 'Pre-release contents information list' in the memory unit 12 as the new evaluation value VALUE (step S311), then ends processing.

As was explained above, with this embodiment, before storing contents so they can be shared with other nodes (before making the contents public), it is possible to store the contents in advance at a plurality of nodes, and distribute the contents within the system, so after the contents are made public, even though there may be distribution requests from a plurality of nodes at the same time to distribute contents, since the contents are stored in advance at a plurality of nodes, it is possible to distribute the contents comparatively smoothly P to P immediately after the contents are made public compared with when the contents are stored by only one node, and thus it is possible to improve the reliability of the overall system.

Moreover, as was explained in '2-5. Contents Saving Process', when the empty recording capacity Sr in the memory unit 12 of a node is not equal to or greater than the amount of information of the contents that are the object of a recording instruction, construction is such that the contents having a low evaluation value VALUE are deleted, so it is possible to perform preparation to make contents public by deleting unpopular contents, storing contents to be made public in the future among a plurality of nodes and distributing the contents within the system before public release.

Furthermore, construction is such that each time copying is performed, the copying start time I at which the next copying is to be performed at each node is updated in order using the public release preparation period E and evaluation value VALUE that are based on the current time and public release time information to, so construction is such that it is possible to change the timing at which to perform the recording instruction at each node, and thus it is possible to prevent adverse effects (for example, delay due to exchanging other messages) such as a increase in load on the entire system that may occur when the nodes in the distribution system start the process for distributing contents at the same time.

Figure 28:
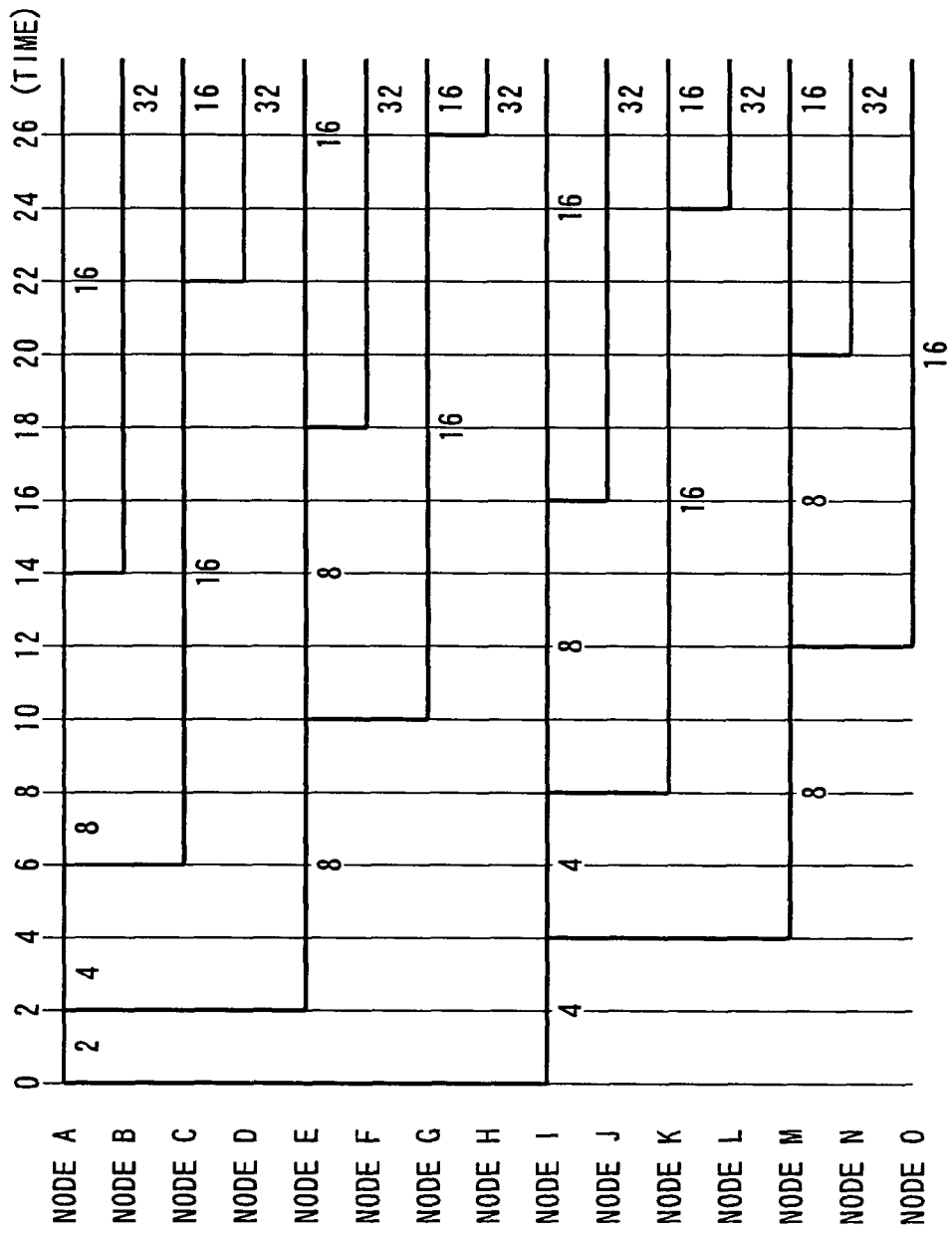
FIG. 28 is a timing chart showing the processing in a second embodiment of the invention for creating copies at nodes A to O.

FIG. 28 is a timing chart that shows the state in which the process for distributing contents (X) is performed by nodes A to O, and where replicas (copies) are made at each of the nodes. In the figure, each of the nodes A to O are shown along the vertical axis, and time is shown along the horizontal axis, and is an example showing the case in which the evaluation value VALUE at node N that first makes the new contents public is defined as 48, and the public release preparation period E is defined as being 48 hours later.

In this chart, all of the numerical values indicate times from when the contents (X) that are the object of the recording instruction are recorded in the memory unit 12 of the respective node until the next copying. In this example, the copying process is performed by one of the nodes at two-hour intervals. In other words, the first node A sends a recording instruction to node I, and node I acquires the contents (X) that are the object of the recording instruction from one of the nodes. More specifically, node I acquires the contents (X) from a node among the plurality of nodes having the contents (X)

that are the object of the recording instruction that has a comparatively small communication load. Two hours later, the node A sends a recording instruction message to node E, and node E similarly acquires the contents (X) from a node among the plurality of nodes having the contents (X) that are the object of the recording instruction that has a comparatively small communication load, and again two hours later, node I sends a recording instruction message to node M.

In this way, it is possible to prevent starting the recording instruction process and copying process all at the same time by the nodes in the distribution system, and to suppress an increase in communication load on the distribution system.

In each of the embodiments described above, the node N that was instructed to record the contents sends a message indicating that recording was successful, and the node N that executed the contents distribution process receives that message and updates the evaluation value VALUE such as the number of copies, and by sending that value to the node N that is the destination of the recording instruction, the node that newly recorded the contents obtains the evaluation value VALUE, however, the invention is not limited to this, and it is possible for the node N to request the evaluation value VALUE from a node having the contents that are the object of the recording instruction. In that case, the node having the contents updates the evaluation value VALUE for the contents, and sends that evaluation value VALUE to the node that requested the evaluation value VALUE.

Moreover, in each of the embodiments described above, the node N that was instructed to record the contents sends a message indicating that recording was successful, and the node N that executed the contents distribution process receives that message, and by sending the public release time information together with the evaluation value VALUE to the node N that is the destination of the recording instruction, the node that newly recorded the contents obtains the public release time information, however, the invention is not limited to this, and since any node having the contents that are the object of the recording instruction always knows the public release time information, it is possible for the node N to request the public release time information from another node having the contents that are the object of the recording instruction.

Figure 29:
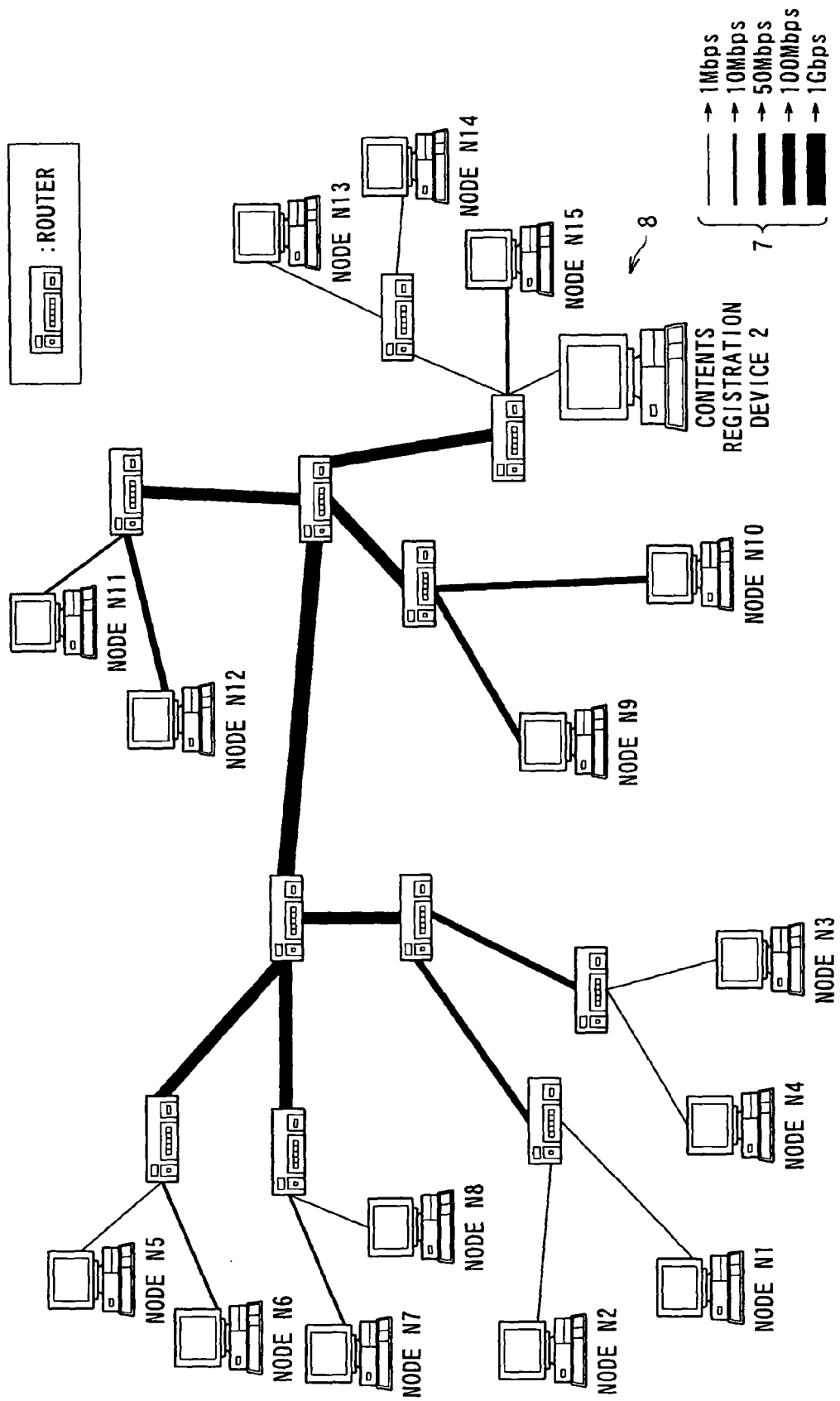
FIG. 29 is a drawing showing the construction of the distribution system in the case where a contents registration device is included.

In each of the embodiments described above, each node is constructed so that it can register new contents that are to be stored so that they can be shared, however, the invention is not limited to this, and as shown in FIG. 29, it is possible to have one (or a few) specified node as a contents registration device 2 for registering contents within the system. That contents registration device 2 is constructed so that it is operated by the contents production company or a system administrator that is entrusted by that production company to manage the contents, and not only is it possible to know the contents that exist within the system, but it is also possible to store contents that are newly registered in the system in a database in the memory unit.

When a node searches for contents, the node can access this contents registration device 2 and reference the contents that are currently registered in the system.

When a contents registration device 2 is used in this way, the nodes do not perform the process of making the contents public in steps S12, S274 or S304. As a method for publicly releasing the contents, construction can be such that contents are made public when as was described above, in the step of recording the contents in the memory unit 12, the node N transfers a message to the root node of the contents by way of DHT routing indicating that the contents are stored (see steps S65, S255), and that root node manages all of the nodes having the contents, and monitors the public release time from the processing by the contents registration device 2, and when the time reaches the public release time, places the contents in the 'usable contents list' that is managed by the content registration device 2, making it possible for other nodes to access the contents for the first time.

The 'usable contents list' mentioned above that is managed by the content registration device 2 can be referenced when nodes in the distribution system search for contents, and is a list that contains all of the contents information registered in the distribution system that can currently be referenced. The contents registration device 2 updates this 'usable contents list' when the time reaches a public release time. In other words, construction can be such that even though contents are registered at the root node before being made public, the contents are not listed in this list until the time passes the public release time that is based on the public release time information, so no other nodes can access the contents.

Furthermore, in each of the embodiments described above, it was presumed that the distribution system creates an overlay network by an algorithm that uses a DHT, however, the invention is not limited to this, and in the case where an overlay network is not used, for example, in the case where the node that sends the contents recording instruction is selected at random (by the exchange of information in the past), the node can be selected from among a plurality of nodes N which addresses are known, and even in the case of selecting a node N that sends the contents request message by comparing the communication load, the communication loads for a plurality of nodes N, which addresses are known, are compared, and a contents request message can be sent to a node N having a relatively small communication load.

As was explained above, the present invention can be used in fields where contents are distributed over a network, and particularly are very effective when applied to fields in which contents that are to be shared by a plurality of nodes before being made public are distributed to each node.

The present invention is not confined to the configuration listed in the foregoing embodiments, but it is easily understood that the person skilled in the art can modify such configurations into various other modes, within the scope of the patent invention described in the claims.

What is claimed is:

1. An information distribution system comprising a plurality of information processing devices that are capable of communicating with each other via a network, and that store at least one shared information, the shared information can be shared by the plurality of information processing devices, wherein each of the information processing device comprises:
a memory unit configured to record the shared information, a public release time information indicating a public release time at which the shared information can be shared, and evaluation information indicating an estimation of access frequency to the shared information, wherein the public release time information and the evaluation information correlate to the shared information; and a controller configured to operate in a distribution mode and recording mode, wherein:
in the distribution mode, the controller:
selects a recording information processing device on the information distribution network;
judges whether the public release time has been reached;
receives record instruction information instructing recording of the shared information;

determines a time interval to be shorter as the access frequency indicated by the evaluation information recorded in the memory unit is higher, wherein the interval time is between a time of receiving the record instruction information and a time of transmitting the record instruction information;

judges whether the time interval passes or not;

transmits the record instruction information to the selected recording information processing device, when the public release time has not been reached and the time interval has passed; and transmits the public release time information and the evaluation information correlating to the shared information that is instructed to be recorded by the record instruction information to the selected recording information processing device;

in the recording mode, the controller:

receives the record instruction information from one of distributing information processing devices on the information distribution network;

acquires communication load information indicating communication loads in the communication paths between the information processing device and the distributing information processing device;

transmits request information that requests transmission of the shared information that is instructed to be recorded by the record instruction information, to one of the information processing devices that is connected by way of the communication path that is found to have a relatively small communication load based on the acquired communication load information;

receives the shared information;

receives the public release time information and the evaluation information correlating to the shared information that is instructed to be recorded by the record instruction information; and stores the shared information, the received public release time information and the received evaluation information.

2. The information distribution system of according to claim 1, wherein in the distribution mode, the controller:

creates the evaluation information and the public release time information corresponding to new shared information, wherein the memory unit records the new shared information, the created public release time information and evaluation information.

3. An information processing device usable in an information distributing network to receive and distribute pre-release contents, the information processing device comprising:

a memory unit configured to record the shared information, a public release time information indicating a public release time at which the shared information can be shared, and evaluation information indicating an estimation of an access frequency to the shared information, wherein public release time information and the evaluation information correlate to the shared information; and a controller configured to operate in a distribution mode and recording mode, wherein:

in the distribution mode, the controller:

determines a time interval to be shorter as the access frequency indicated by the evaluation information recorded in the memory unit is higher, wherein the time interval is between a time of receiving record instruction information and a time of transmitting the record instruction information;

judges that the public release time has not been reached;

judges that the time interval has passed;

in the recording mode, the controller;

receives the record instruction information instructing recording of the shared information from one of distributing information processing devices on the information distribution network;

acquires communication load information indicating communication loads in communication paths between the information processing device and the distributing information processing device;

transmits request information that requests transmission of the shared information that is instructed to be recorded by the record instruction information, to one of the information processing devices that is connected by way of a communication path that is found to have a relatively small communication load based on the acquired communication load information;

receives the shared information;

receives the public release time information and the evaluation information corresponding to the shared information that is instructed to be recorded by the record instruction information; and stores the shared information, the received public release time information and the received evaluation information.

4. The information processing device of according to claim 3, wherein:

in the distribution mode, the controller:

selects a recording information processing device on the information distribution network;

judges whether the public release time has been reached;

determines a time interval to be shorter as the access frequency indicated by the evaluation information recorded in the memory unit is higher, wherein the interval time is between a time of receiving the record instruction information and a time of transmitting the record instruction information;

judges whether the time interval passes or not;

transmits the record instruction information to the selected recording information processing device, when the public release time has not been reached and the time interval has passed.

5. The information processing device according to claim 3, wherein in the distribution mode, the controller:

receives the request information that requests transmission of the shared information that is instructed to be recorded by the record instruction information from an other information processing device; and transmits the shared information to the other information processing device.

6. The information processing device according to claim 5, wherein in the recording mode, the controller:

transmits record success information indicating success of recording the shared information in the memory unit, to either the distributing information processing device, which transmits the record instruction information, or the different information processing device, which transmits the shared information;

receives updated evaluation information corresponding to the shared information;

in the distribution mode, the controller:
   receives the record success information;
   updates the evaluation information corresponding to the shared information, which is transmitted by the information processing device transmitting the request information.

7. The information processing device according to claim 5, wherein
in the recording mode, the controller:
   judges whether an empty memory capacity of the memory unit is larger than an amount of the shared information or not;
   selects least accessed shared information, indicated by the evaluation information, in the memory unit as deletion shared information when judged that the empty memory capacity is smaller than the amount of the shared information; and
   deletes the least accessed shared information.

8. The information processing device according to claim 3, wherein
in the distribution mode, the controller:
   creates the evaluation information and the public release time information correlating to new shared information,
wherein the memory unit records the new shared information, the created public release time information and evaluation information.

9. The information processing device of according to claim 6, wherein
in the distribution mode, the controller:
   updates the evaluation information to be less than before-updated evaluation information.

10. The information processing device according to claim 3, wherein
the communication load is set based on at least one of a number of relay devices in the communication path, a length of delay time in the communication path, and an effective bandwidth of the communication path.

11. The information processing device according to claim 3, wherein
in the recording mode, the controller:
   transmits recording notification information indicating that new shared information is recorded in the memory unit.

12. A non-transitory computer-readable recording medium recording a node processing program to be performed in an information processing device usable in an information distributing network to receive and distribute pre-release contents, wherein the information processing device includes a memory unit configured to record shared information, a public release time information indicating a public release time at which the shared information can be shared, and evaluation information indicating an estimation of an access frequency to the shared information, wherein the public release time information and the evaluation information correlate to the shared information; and a controller configured to operate in a distribution mode and recording mode, the node processing program comprising the steps of:
   determining a time interval to be shorter as the access frequency indicated by the evaluation information recorded in the memory unit is higher, wherein the time interval is between a time of receiving record instruction information and a time of transmitting the record instruction information;
   judging that the public release time has not been reached;
   judging that the time interval has passed;
   receiving the record instruction information instructing recording of the shared information from one of distributing information processing devices on the information distribution network;
   acquiring communication load information indicating communication loads in communication paths between the information processing device and the distributing information processing devices;
   transmitting request information that requests transmission of the shared information that is instructed to be recorded by the record instruction information, to one of the information processing devices that is connected by way of a communication path that is found to have a relatively small communication load based on the acquired communication load information;
   receiving the shared information;
   receiving the public release time information and the evaluation information correlating to the shared information that is instructed to be recorded by the record instruction information; and
   storing the shared information, the received public release time information and the received evaluation information.

13. An information processing method of operating an information processing device usable in an information distributing network to receive and distribute pre-release contents, wherein the information processing device includes a memory unit configured to record shared information, a public release time information indicating a public release time at which the shared information can be shared, and evaluation information indicating an estimation of an access frequency to the shared information, wherein the public release time information and the evaluation information correlate to the shared information; and a controller configured to operate in a distribution mode and recording mode, the method including steps in a distribution mode and recording mode,
the steps in the distribution mode comprising:
   determining a time interval to be shorter as the access frequency indicated by the evaluation information recorded in the memory unit is higher, wherein the time interval is between a time of receiving record instruction information and a time of transmitting the record instruction information;
   judging that the public release time has not been reached;
   judging that the time interval has passed;
the steps in the recording mode comprising:
   receiving the record instruction information instructing recording of the shared information from one of distributing information processing devices on the information distribution network;
   acquiring communication load information indicating communication loads in communication paths between the information processing device and the distributing information processing device;
   transmitting request information that requests transmission of the shared information that is instructed to be recorded by the record instruction information, to one of the information processing devices that is connected by way of a communication path that is found to have a relatively small communication load based on the acquired communication load information;
   receiving the shared information;
   receiving the public release time information and the evaluation information correlating to the shared information that is instructed to be recorded by the record instruction information; and storing the shared information, the received public release time information and the received evaluation information.

14. An information processing device usable in an information distribution network to receive and distribute pre-release contents before a predetermined public release time for the pre-release contents, the information processing device comprising:
a memory comprising:
a pre-release contents section for storing the pre-release contents;
a public release time section for storing the predetermined public release time, the predetermined public release time indicating a time at which the pre-release contents will be available for distribution to the public; and
an evaluation value section for storing an evaluation value, the evaluation value indicating the extent to which the pre-release contents will be distributed throughout the information distribution network before the predetermined public release time; and
a controller configured to operate in a pre-release distribution mode and a pre-release recording mode, wherein:
in the pre-release distribution mode, the controller:
selects the pre-release contents for distribution by referring to the stored predetermined public release time and the stored evaluation value;
selects a target information processing device within the information distribution network to which the pre-release contents will be sent;
transmits a recording instruction message to the target information processing device;
receives a contents request message from the target information processing device; and
when a contents request message is received from the target information processing device, transmits the pre-release contents to the target information processing device;
receives a response message from the target information processing device indicating that the target information processing device has stored the pre-release contents;
generates a target evaluation value;
updates the stored evaluation value; and
transmits the stored predetermined public release time and generated target evaluation value to the target information processing device; and
in the pre-release recording mode, the controller:
receives a recording instruction message from a distributing information processing device within the information distribution network;
identifies information processing devices within the information distribution network that have stored the pre-release contents;
selects from the identified information processing devices an information distribution device having a lowest communication load as a transmitting information processing device;
transmits a contents request message to the transmitting information processing device;
receives the pre-release contents from the transmitting information processing device;
stores the pre-release contents in the pre-release contents section of the memory;
transmits a response message to the distributing information processing device indicating that the pre-release contents has been stored in the pre-release contents section of the memory;
receives the predetermined public release time and the evaluation value from the distributing information processing device;
stores the received predetermined public release in the public release time section of the memory; and
stores the target evaluation value in the evaluation value section of the memory.

15. The information processing device of claim 14, wherein:
the evaluation value section stores an access frequency indicating an estimation of a frequency with which the pre-release contents will be distributed; and
in the pre-release distribution mode, the controller:
sets a time interval that is a period of delay between the time of receiving the contents request message from the target information processing device and transmitting the pre-release contents to the target information processing device, the time interval being set shorter when the stored access frequency is higher;
determines whether the time interval has passed; and
transmits the pre-release contents to the target information processing device.

16. A non-transitory computer-readable storage medium storing a computer-executable pre-release contents reception and distribution program, the program comprising:
memory instructions comprising:
storing pre-release contents in a pre-release contents section;
storing, in a public release time section, a predetermined public release time, the predetermined public release time indicating a time at which the pre-release contents will be available for distribution to the public; and
storing an evaluation value in an evaluation value section, the evaluation value indicating the extent to which the pre-release contents will be distributed throughout an information distribution network before the predetermined public release time; and
instructions for a controller to operate in a pre-release distribution mode and a pre-release recording mode, wherein:
in the pre-release distribution mode, the controller:
selects the pre-release contents for distribution by referring to the stored predetermined public release time and the stored evaluation value;
selects a target information processing device within the information distribution network to which the pre-release contents will be sent;
transmits a recording instruction message to the target information processing device;
receives a contents request message from the target information processing device; and
when a contents request message is received from the target information processing device, transmits the pre-release contents to the target information processing device;
receives a response message from the target information processing device indicating that the target information processing device has stored the pre-release contents;
generates a target evaluation value;
updates the stored evaluation value; and
transmits the stored predetermined public release time and generated target evaluation value to the target information processing device; and in the pre-release recording mode, the controller:
  receives a recording instruction message from a distributing information processing device within the information distribution network;
  identifies information processing devices within the information distribution network that have stored the pre-release contents;
  selects from the identified information processing devices an information distribution device having a lowest communication load as a transmitting information processing device;
  transmits a contents request message to the transmitting information processing device;
  receives the pre-release contents from the transmitting information processing device;
  stores the pre-release contents in the pre-release contents section of the memory;
  transmits a response message to the distributing information processing device indicating that the pre-release contents has been stored in the pre-release contents section of the memory;
  receives the predetermined public release time and the evaluation value from the distributing information processing device;
  stores the received predetermined public release in the public release time section of the memory; and
  stores the target evaluation value in the evaluation value section of the memory.

17. The non-transitory computer-readable storage medium of claim 16, wherein:
  the evaluation value section stores an access frequency indicating an estimation of a frequency with which the pre-release contents will be distributed; and
  in the pre-release distribution mode, the controller:
    sets a time interval that is a period of delay between the time of receiving the contents request message from the target information processing device and transmitting the pre-release contents to the target information processing device, the time interval being set shorter when the stored access frequency is higher;
    determines whether the time interval has passed; and
    transmits the pre-release contents to the target information processing device.

* * * * *